United States Patent
Cho et al.

(10) Patent No.: US 9,051,425 B2
(45) Date of Patent: *Jun. 9, 2015

(54) POLY(AMIDE-IMIDE) BLOCK COPOLYMER, ARTICLE INCLUDING SAME, AND DISPLAY DEVICE INCLUDING THE ARTICLE

(71) Applicant: SAMSUNG ELECTRONICS CO., LTD., Suwon-si, Gyeonggi-do (KR)

(72) Inventors: Chung Kun Cho, Suwon-si (KR); Androsov Dmitry, Suwon-si (KR); Kalinina Fedosya, Hwaseong-si (KR); Yoon Seok Ko, Seoul (KR); Kovalev Mikhail, Suwon-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/685,338

(22) Filed: Nov. 26, 2012

(65) Prior Publication Data

US 2013/0203937 A1  Aug. 8, 2013

(30) Foreign Application Priority Data

Feb. 7, 2012 (KR) .................. 10-2012-0012563

(51) Int. Cl.
*C08L 77/06* (2006.01)
*C08G 69/42* (2006.01)
*C08G 73/10* (2006.01)
*C08G 73/14* (2006.01)

(52) U.S. Cl.
CPC ............ *C08G 69/42* (2013.01); *C08G 73/1039* (2013.01); *C08G 73/1064* (2013.01); *C08G 73/14* (2013.01)

(58) Field of Classification Search
None
See application file for complete search history.

(56) References Cited

U.S. PATENT DOCUMENTS

| 5,268,416 A | 12/1993 | Traubel et al. |
| 6,531,569 B1 | 3/2003 | Tachiki et al. |
| 2009/0226642 A1* | 9/2009 | Simone et al. ............... 428/1.33 |

FOREIGN PATENT DOCUMENTS

| CA | 2008859 | * | 8/1990 |
| JP | 3994185 B2 | | 8/2007 |
| JP | 2010-007034 A | | 1/2010 |

OTHER PUBLICATIONS

Choi, K.Y. et al., Soluble Polyimides Containing Alicyclic Structures, Macromolecular Symposia, 1999, 142: 193-204.
Sarojadevi, M. et al., Structure-Property Relationships in Processable Heat Resistant Poly(Amide-Imide-Imide)s for High-Temperature Applications, Polyimides and Other High Temperature Polymers, Synthesis, Characterization and Applications, vol. 5, CRC Press 2009; pp. 93-117.

* cited by examiner

*Primary Examiner* — Susannah Chung
*Assistant Examiner* — Robert T Butcher
(74) *Attorney, Agent, or Firm* — Cantor Colburn LLP

(57) ABSTRACT

A poly(amide-imide) block copolymer that includes a first segment including a repeating unit represented by the following Chemical Formula 1 and a second segment including a repeating unit represented by the following Chemical Formula 2:

Chemical Formula 1

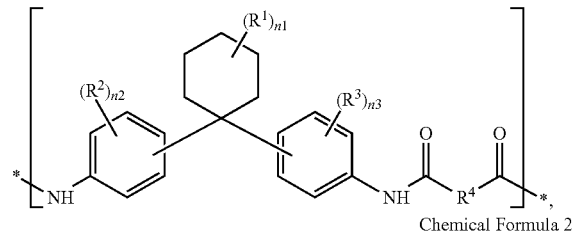

Chemical Formula 2

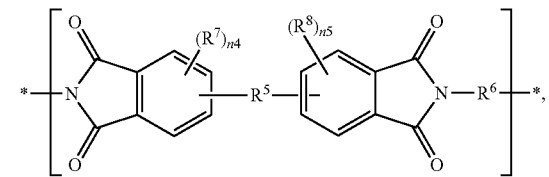

wherein, $R^1$ to $R^8$, and $n1$ to $n5$, in Chemical Formula 1 and 2, are defined herein.

22 Claims, 2 Drawing Sheets

POLY(AMIDE-IMIDE) BLOCK COPOLYMER, ARTICLE INCLUDING SAME, AND DISPLAY DEVICE INCLUDING THE ARTICLE

CROSS-REFERENCE TO RELATED APPLICATION

This application claims priority to and the benefit of Korean Patent Application No. 10-2012-0012563, filed on Feb. 7, 2012, and all the benefits accruing therefrom under 35 U.S.C. §119, the entire contents of which are incorporated herein by reference.

BACKGROUND

1. Field

A poly(amide-imide) block copolymer, an article including the same, and a display device including the article are disclosed.

2. Description of the Related Art

A colorless transparent material has been developed for a diverse range of applications, such as for an optical lens, a functional optical film, and a disk substrate. However, as information devices are further miniaturized and display devices provide higher resolution, more functions and greater performance are required from the material.

Therefore, there remains a need for a colorless transparent material having excellent or improved transparency, heat resistance, mechanical strength, and flexibility.

SUMMARY

An exemplary embodiment provides a poly(amide-imide) block copolymer having excellent or improved transparency, heat resistance, mechanical strength, and flexibility.

Another embodiment provides an article including the poly(amide-imide) block copolymer.

Yet another embodiment provides a display device including the article.

According to an embodiment, provided is a poly(amide-imide) block copolymer that includes a first segment including a repeating unit represented by the following Chemical Formula 1, and a second segment including a repeating unit represented by the following Chemical Formula 2.

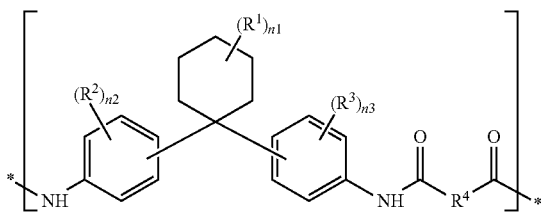

Chemical Formula 1

In Chemical Formula 1, $R^1$ to $R^3$ are the same or different in each repeating unit and are each independently hydrogen, a halogen, a hydroxy group, an alkoxy group (—$OR^{200}$, wherein $R^{200}$ is a C1 to C10 aliphatic group), a silyl group (—$SiR^{201}R^{202}R^{203}$, wherein $R^{201}$, $R^{202}$, and $R^{203}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and in an embodiment, hydrogen or a substituted or unsubstituted C1 to C5 aliphatic group, and in another embodiment, hydrogen or a substituted or unsubstituted C1 to C3 aliphatic group.

$R^4$ is the same or different in each repeating unit, and each is independently a substituted or unsubstituted C6 to C30 aromatic group.

n1 is the same or different in each repeating unit and is an integer ranging from 0 to 10, specifically 0 to 5, and more specifically 0 to 3.

n2 and n3 are the same or different in each repeating unit and is each independently an integer ranging from 0 to 4, specifically 0 to 3, and more specifically 0 to 2.

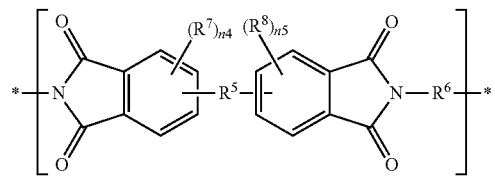

Chemical Formula 2

In Chemical Formula 2, $R^5$ is the same or different in each repeating unit, and each is independently a single bond, a substituted or unsubstituted C1 to C30 aliphatic group, a substituted or unsubstituted C3 to C30 alicyclic group, a substituted or unsubstituted C6 to C30 aromatic group, substituted or unsubstituted C2 to C30 heterocyclic group, —O—, —S—, —S(=O)$_2$—, or —C(=O)—, and in an embodiment, a single bond, a substituted or unsubstituted C1 to C10 aliphatic group, a substituted or unsubstituted C3 to C10 alicyclic group, a substituted or unsubstituted C6 to C15 aromatic group, a substituted or unsubstituted C2 to C15 heterocyclic group, —O—, —S—, —S(=O)$_2$—, or —C(=O)—, and in another embodiment, a single bond or C(CF$_3$)$_2$, $R^6$ is the same or different in each repeating unit, and each is independently a substituted or unsubstituted C6 to C30 aromatic group, or a substituted or unsubstituted C3 to C30 alicyclic group, and in an embodiment, a substituted or unsubstituted C6 to C15 aromatic group, or a substituted or unsubstituted C3 to C15 alicyclic group; wherein the alicyclic group, or aromatic group is present singularly; at least two of the alicyclic group, or aromatic group are linked to provide a condensed cyclic group; or at least two of the alicyclic group, or aromatic group are linked via a single bond, a substituted or unsubstituted C13 to C20 fluorenylene group, a substituted or unsubstituted C3 to C30 alicyclic group, —O—, —S—, —C(O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and $R^7$ and $R^8$ are the same or different in each repeating unit and are each independently hydrogen, a halogen, a hydroxy group, an alkoxy group (—$OR^{204}$, wherein $R^{204}$ is a C1 to C10 aliphatic group), a silyl group (—$SiR^{205}R^{206}R^{207}$, wherein $R^{205}$, $R^{206}$, and $R^{207}$ are the same or different and are each independently hydrogen or a C1 to C10 aliphatic group), a substituted or unsubstituted C1 to C10 aliphatic group, a substituted or unsubstituted C3 to C30 alicyclic group, or a C6 to C20 substituted or unsubstituted aromatic group, and in an embodiment, hydrogen or a substituted or unsubstituted C1 to C5 aliphatic group, and in another embodiment, hydrogen or a substituted or unsubstituted C1 to C3 aliphatic group.

n4 and n5 are the same or different in each repeating unit and are each independently an integer ranging from 0 to 3, specifically 0 to 2, and more specifically 0 or 1.

In an embodiment, $R^4$ is the same or different in each repeating unit, and each is independently one or more of the following chemical formulae:

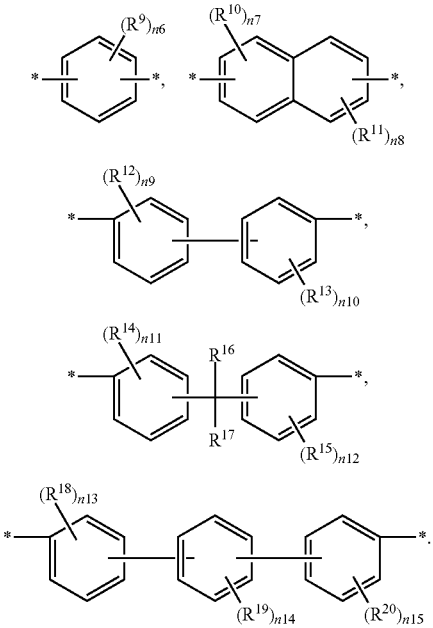

In the above chemical formulae, $R^9$ to $R^{29}$ are the same or different and are each independently hydrogen, deuterium, a halogen, a substituted or unsubstituted C1 to C10 aliphatic group, or a substituted or unsubstituted C6 to C20 aromatic group, n6, and n9 to n15 are each independently an integer ranging from 0 to 4, and n7 and n8 are each independently an integer ranging from 0 to 3.

In another embodiment, $R^4$ is the same or different in each repeating unit, and each is independently the following chemical formulae:

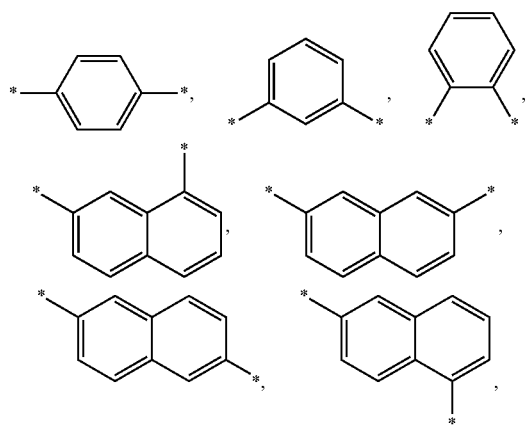

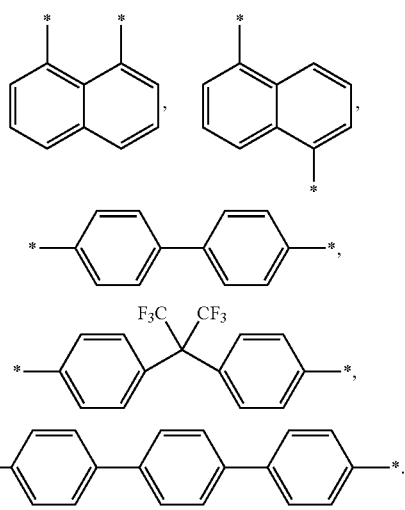

The repeating unit represented by Chemical Formula 1 may include a repeating unit represented by the following Chemical Formula 1-1 to 1-3, or a combination thereof, and the repeating unit represented by Chemical Formula 2 may include a repeating unit represented by the following Chemical Formula 2-1, a repeating unit represented by the following Chemical Formula 2-2, or a combination thereof.

Chemical Formula 1-1

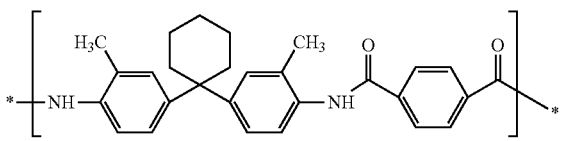

Chemical Formula 1-2

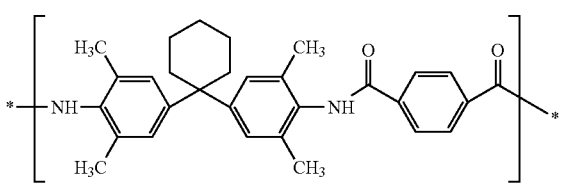

Chemical Formula 1-3

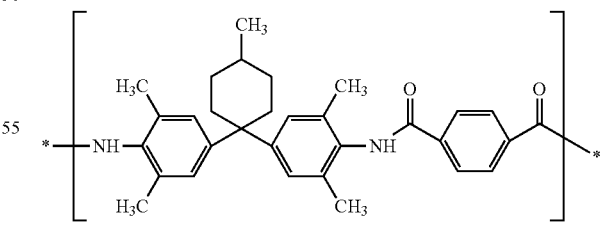

Chemical Formula 2-1

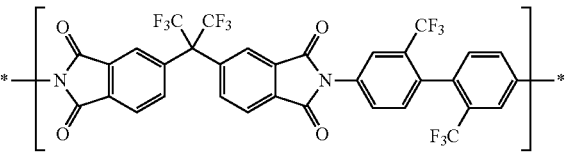

Chemical Formula 2-2

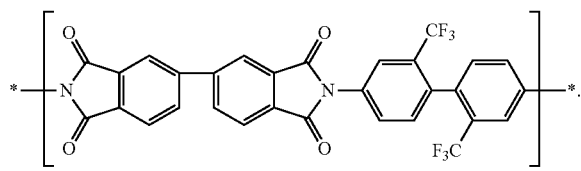

In the poly(amide-imide) block copolymer, the first segment is the same or different in each poly(amide-imide) block copolymer and each independently includes about 1 to about 1000 repeating units of the repeating unit represented by Chemical Formula 1, wherein the repeating unit is the same or different in each first segment.

The first segment may have a weight average molecular weight of about 500 grams per mole (g/mol) to about 50,000 g/mol.

The first segment may further include a repeating unit represented by the following Chemical Formula 3, a repeating unit represented by the following Chemical Formula 4, or a combination thereof.

Chemical Formula 3

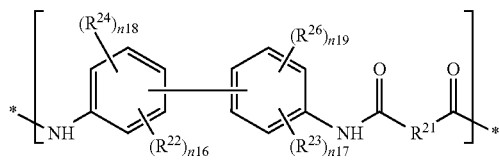

In Chemical Formula 3,
$R^{21}$ is the same or different in each repeating unit, and each is independently a substituted or unsubstituted C6 to C30 aromatic group, $R^{22}$ and $R^{23}$ are the same or different in each repeating unit and are each independently an electron withdrawing group, and in an embodiment —$CF_3$, —$CCl_3$, —$CBr_3$, —$Cl_3$, —F, —Cl, —Br, —I, —$NO_2$, —CN, —$COCH_3$, or —$CO_2C_2H_5$, $R^{24}$ and $R^{25}$ are the same or different in each repeating unit and are each independently hydrogen, a halogen, a hydroxy group, an alkoxy group (–$OR^{208}$, wherein $R^{208}$ is a C1 to C10 aliphatic group), a silyl group (—$SiR^{209}R^{210}R^{211}$, wherein $R^{209}$, $R^{210}$, and $R^{211}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, n16 is the same or different in each repeating unit and is an integer ranging from 1 to 4, n18 is the same or different in each repeating unit and is an integer ranging from 0 to 4, and a sum of n16 and n18 is an integer ranging from 1 to 4, n17 is the same or different in each repeating unit and is an integer ranging from 1 to 4, n19 is the same or different in each repeating unit and is an integer ranging from 0 to 4, and a sum of n17 and n19 is an integer ranging from 1 to 4.

Chemical Formula 4

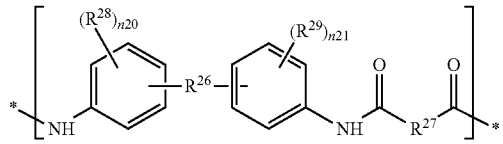

In Chemical Formula 4,
$R^{26}$ is the same or different in each repeating unit, and each is independently —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, a substituted or unsubstituted C5 to C30 alicyclic group fused to each phenyl ring to provide a condensed cyclic group, or a substituted or unsubstituted C6 to C30 aromatic group, wherein the aromatic group is present singularly; at least two of the aromatic groups are linked to provide a condensed cyclic group; or at least two of the aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{27}$ is the same or different in each repeating unit, and each is independently a substituted or unsubstituted C6 to C30 aromatic group, $R^{28}$ and $R^{29}$ are the same or different in each repeating unit and are each independently hydrogen, a halogen, a hydroxy group, an alkoxy group (–$OR^{212}$, wherein $R^{212}$ is a C1 to C10 aliphatic group), a silyl group (—$SiR^{213}R^{214}R^{215}$, wherein $R^{213}$, $R^{214}$, and $R^{215}$ are the same or different and are each independently hydrogen, or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and n20 and n21 are the same or different in each repeating unit and are each independently an integer ranging from 0 to 4.

In an embodiment, the repeating unit represented by Chemical Formula 3 may include a repeating unit represented by the following Chemical Formulae 3-1 to 3-3, or a combination thereof, and the repeating unit represented by Chemical Formula 4 may include a repeating unit represented by the following Chemical Formulae 4-1 to 4-3.

Chemical Formula 3-1

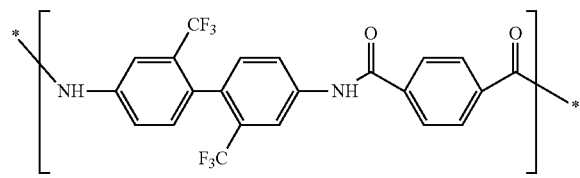

Chemical Formula 3-2

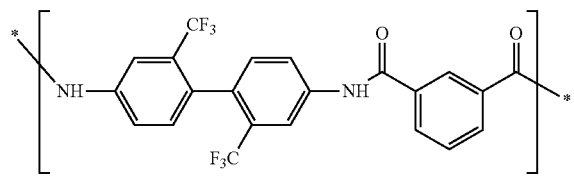

Chemical Formula 3-3

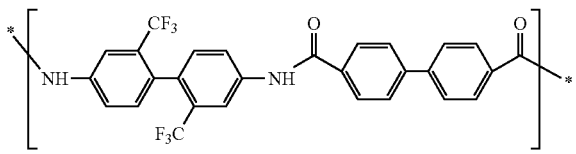

Chemical Formula 4-1

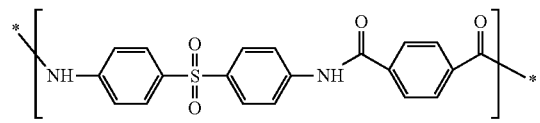

Chemical Formula 4-2

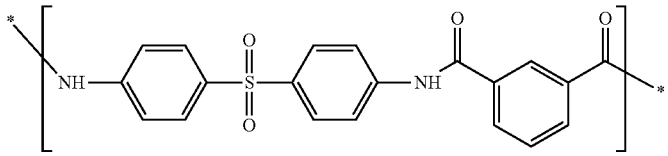

Chemical Formula 4-3

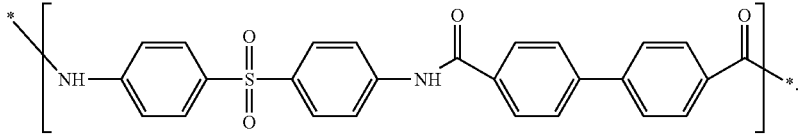

In the poly(amide-imide) block copolymer, the second segment is the same or different in each poly(amide-imide) block copolymer and each independently includes about 1 to about 1000 repeating units of the repeating unit represented by Chemical Formula 2, wherein the repeating unit is the same or different in each second segment.

The second segment may have a weight average molecular weight of about 500 g/mol to about 50,000 g/mol.

In the poly(amide-imide) block copolymer, a total moles of a repeating unit in the first segment and a total moles of a repeating unit in the second segment may be present at a mole ratio of about 95:5 to about 5:95.

According to another embodiment, an article including the poly(amide-imide) block copolymer is provided.

The article may be a film, a fiber, a coating material, or an adhesive.

The article may have a total light transmittance of greater than or equal to about 80% at a wavelength range of about 380 nanometers (nm) to about 780 nm, and the article may have a light transmittance of greater than or equal to about 60% at a wavelength of about 400 nm.

The article may have a haze of less than or equal to about 3%, and a yellow index ("YI") of less than or equal to about 3.

The article may have a coefficient of thermal expansion of less than or equal to about 35 parts per million per ° C.

According to another embodiment, a display device including the article is provided.

According to another embodiment, a method for preparing a poly(amide-imide) block copolymer includes: providing a first segment; providing a precursor of a second segment reactive with the first segment; copolymerizing the first segment and the precursor of the second segment; and imidizing the precursor of the second segment to provide the poly(amide-imide) block copolymer, wherein the poly(amide-imide) block copolymer comprises the above-described poly(amide-imide) block copolymer.

According to another embodiment, a method for preparing an article includes: disposing the above-described poly(amide-imide) block copolymer on a substrate to form a layer; drying the layer; delaminating the layer from the substrate; elongating the layer; and heat treating the layer.

BRIEF DESCRIPTION OF THE DRAWINGS

The above and other aspects, advantages and features of this disclosure will become more apparent by describing in further detail embodiments thereof with reference to the accompanying drawings.

DETAILED DESCRIPTION

Figure 1:
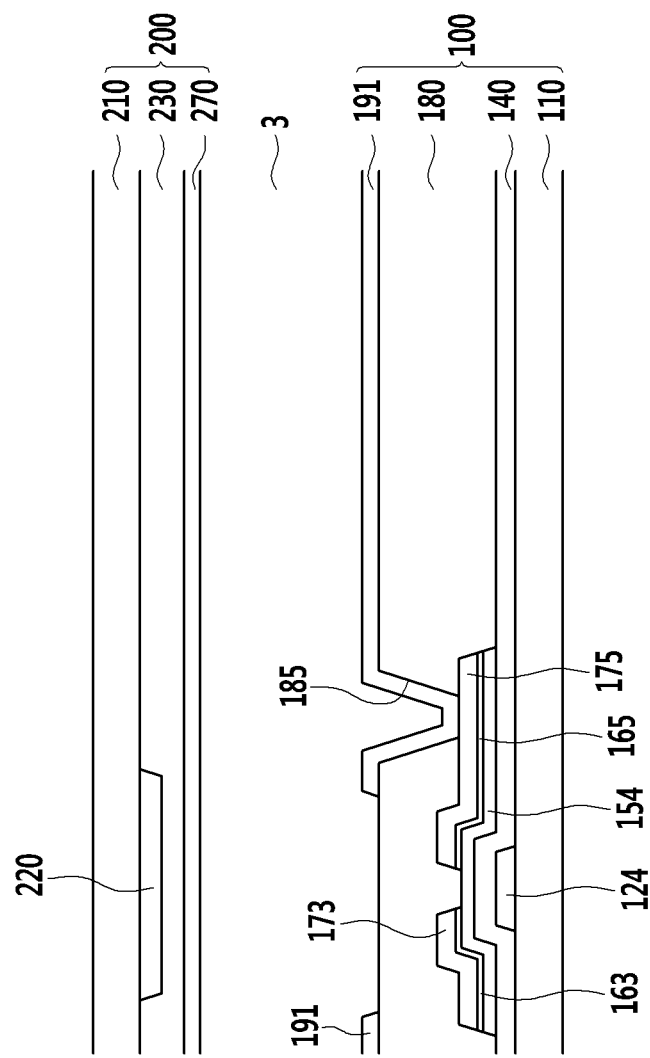
FIG. 1 is a cross-sectional view of a liquid crystal display ("LCD") in accordance with an embodiment, as disclosed herein.

This disclosure will be described more fully hereinafter with reference to the accompanying drawings, in which various embodiments are shown. This disclosure may, however, be embodied in many different forms and should not be construed as limited to the exemplary embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are not to scale for clarity.

It will be understood that when an element such as a layer, film, region, or substrate is referred to as being "on" or "disposed on" another element, it can be directly on the other element or intervening elements may also be present. In contrast, when an element is referred to as being "directly on" or "directly disposed on" another element, there are no intervening elements present.

The terminology used herein is for the purpose of describing particular embodiments only and is not intended to be limiting. As used herein, the singular forms "a," "an," and "the" are intended to include the plural forms as well, including "at least one," unless the content clearly indicates otherwise. "Or" means "and/or." It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a specific definition is not otherwise provided, the term "substituted" refers to compound or group substituted with a substituent including a halogen (specifically the halogens —F, —Br, —Cl, or —I), a hydroxyl group, a nitro group, a cyano group, an amino group (—$NH_2$, —NH($R^{100}$) or —N($R^{101}$)($R^{102}$) wherein $R^{100}$, $R^{101}$, and $R^{102}$ are the same or different and are each independently a C1 to C10 alkyl group, an amidino group, a hydrazino group, a hydrazono group, a carboxyl group (—C(=O)OH), an ester group, a ketone group, a substituted or unsubstituted C1 to C30 alkyl group, a substituted or unsubstituted C3 to C30 alicyclic group, a substituted or unsubstituted C6 to C30 aryl group, a substituted or unsubstituted C2 to C30 alkenyl group, a substituted or unsubstituted C2 to C30 alkynyl group, a substituted or unsubstituted C5 to C30 heteroaryl group, and a substituted or unsubstituted C2 to C30 heterocyclic group, instead of a functional group, or two or more of the foregoing substituents may be linked to each other to provide a ring, provided that the substituted atom's normal valence is not exceeded.

As used herein, when a specific definition is not otherwise provided, the term "alkyl" group refers to a straight or branched chain saturated aliphatic hydrocarbon having the specified number of carbon atoms, for example a C1 to C30 alkyl group, and specifically a C1 to C15 alkyl group, and having a valence of at least one, optionally substituted with one or more substituents where indicated, provided that the valence of the alkyl group is not exceeded. Non-limiting examples include methyl, ethyl, propyl, trifluoromethyl, difluoromethyl, 2-fluoroethyl, and penta-fluoroethyl.

The term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified, for example a C3 to C30 cycloalkyl group, and specifically a C3 to C18 cycloalkyl group, wherein the number means the number of ring members present in the one or more rings.

The term "cycloalkenyl" group refers to a stable monovalent aliphatic monocyclic or polycyclic group having at least one carbon-carbon double bond, wherein all ring members are carbon. Non-limiting examples include cyclopentenyl and cyclohexenyl.

The term "cycloalkynyl" group refers to a stable aliphatic monocyclic or polycyclic group having at least one carbon-carbon triple bond, wherein all ring members are carbon. Non-limiting examples include cyclohexynyl.

The term "cycloalkylene" group refers to a divalent radical formed by the removal of two hydrogen atoms from one or more rings of a cycloalkyl group, as defined above.

The term "cycloalkenylene" group refers to a stable aliphatic 5-15-membered monocyclic or polycyclic, divalent radical having at least one carbon-carbon double bond, which comprises one or more rings connected or bridged together. Unless mentioned otherwise, the cycloalkenylene radical can be linked at any desired carbon atom provided that a stable structure is obtained. If the cycloalkenylene radical is substituted, this may be so at any desired carbon atom, once again provided that a stable structure is obtained. Non-limiting examples thereof include cyclopentenylene, cyclohexenylene, cycloheptenylene, cyclooctenylene, cyclononenylene, cyclodecenylene, norbornenylene, 2-methylcyclopentenylene, 2-methylcyclooctenylene, and the like.

The term "cycloalkynylene" group refers to a stable aliphatic 8- to 15-membered monocyclic or polycyclic divalent radical having at least one carbon-carbon triple bond and consisting solely of carbon and hydrogen atoms which may comprise one or more fused or bridged ring(s), preferably a 8- to 10-membered monocyclic or 12- to 15-membered bicyclic ring. Unless otherwise specified, the cycloalkynylene ring may be attached at any carbon atom which results in a stable structure and, if substituted, may be substituted at any suitable carbon atom which results in a stable structure. Non-limiting examples include cyclooctynylene, cyclononynylene, cyclodecynylene, 2-methylcyclooctynylene, and the like.

The term "alkoxy" group refers to an alkyl group as defined above, having the specified number of carbon atoms, for example a C1 to C30 alkoxy group, and specifically a C1 to C18 alkoxy group, linked via an oxygen, e.g. alkyl-O—.

The term "ester" group refers to a —C(=O)OR group, wherein R is an aliphatic group as defined below, having the specified number of carbon atoms, for example a C2 to C30 ester group, and specifically a C2 to C18 ester group, wherein the carbon of the carbonyl group is included in the specified number of carbon atoms, for example a C2 to C30 ester group, and specifically a C2 to C18 ester group, wherein the carbon of the carbonyl group is included in the specified number of carbon atoms.

The term "ketone" group refers to a —C(=O)R group, wherein R is an aliphatic group as defined below, having the specified number of carbon atoms, for example a C2 to C30 ketone group, and specifically a C2 to C18 ketone group, wherein the carbon of the carbonyl group is included in the specified number of carbon atoms.

The term "aryl group" refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated, or partially unsaturated and multiple rings, if present, may be fused, pendent, spirocyclic, linked via a substituted or unsubstituted C1 to C18 alkylene group, or a combination thereof. Non-limiting examples include phenyl, naphthyl, and tetrahydronapthyl groups.

The term "aryloxy" group refers to an aryl group as defined above, having the specified number of carbon atoms, for example a C6 to C30 aryloxy group, and specifically a C6 to C18 aryloxy group, linked via an oxygen, e.g. aryl-O—.

The term "alkenyl" group refers to a straight or branched chain hydrocarbon that comprises at least one carbon-carbon double bond, having the specified number of carbon atoms, for example a C2 to C30 alkenyl group, and specifically a C2 to C18 alkenyl group, and having a valence of at least one, optionally substituted with one or more substituents where indicated, provided that the valence of the alkenyl group is not exceeded.

The term "alkynyl" group refers to a straight or branched chain, monovalent hydrocarbon group having at least one carbon-carbon triple bond. Non-limiting examples include ethynyl.

The term "alkylene" group refers to a straight or branched chain, saturated, aliphatic hydrocarbon group having the specified number of carbon atoms, for example a C1 to C30 alkylene group, and specifically a C1 to C18 alkylene group, having a valence of at least two, optionally substituted with one or more substituents where indicated, provided that the valence of the alkyl group is not exceeded.

The term "alkenylene" group refers to a straight or branched chain hydrocarbon group having at least one carbon-carbon double bond and having a valence of at least two, optionally substituted with one or more substituents where indicated, provided that the valence of the alkenyl group is not exceeded.

The term "alkynylene" group refers to a straight or branched chain divalent aliphatic hydrocarbon that has one or more unsaturated carbon-carbon bonds, at least one of which is a triple bond. Non-limiting examples include ethynylene.

The term "arylene" group refers to a divalent radical formed by the removal of two hydrogen atoms from one or more rings of an aromatic hydrocarbon, wherein the hydrogen atoms may be removed from the same or different rings, each of which rings may be aromatic or nonaromatic, and having the specified number of carbon atoms, for example a C6 to C30 arylene group, and specifically a C6 to C16 arylene group, optionally substituted with one or more substituents where indicated, provided that the valence of the arylene group is not exceeded. More than one ring may be present, and any additional rings may be independently aromatic, saturated, or partially unsaturated and multiple rings, if present, may be fused, pendent, spirocyclic, linked via a substituted or unsubstituted C1 to C18 alkylene group, or a combination thereof. Non-limiting examples include phenylene, naphthylene, and tetrahydronaphthylene groups.

The term "hydrocarbon" refers to an organic compound having at least one carbon atom and at least one hydrogen atom, optionally substituted with one or more substituents where indicated.

As used herein, when a specific definition is not otherwise provided, the term "aliphatic group" refers to a C1 to C30 alkyl group, a C2 to C30 alkenyl group, a C2 to C30 alkynyl group, a C1 to C30 alkylene group, C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group.

The term "alicyclic group" refers to a C3 to C30 cycloalkyl group, a C3 to C30 cycloalkenyl group, a C3 to C30 cycloalkynyl group, a C3 to C30 cycloalkylene group, C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

The term "aromatic group" refers to a C6 to C30 aryl group or a C6 to C30 arylene group, for example a C6 to C16 aryl group or a C6 to C16 arylene group.

The term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, wherein the foregoing heterocyclic groups each include 1 to 3 heteroatoms selected from O, S, N, P, Si, and a combination thereof in one ring. Other heteroatoms may also be present. As used herein, when a definition is not otherwise provided, the term "combining" is inclusive of mixing and copolymerizing, and the term "combination" includes a mixture, a copolymer, a stacked structure, a composite, an alloy, a blend, a reaction product or the like.

In addition, in the specification, the mark "*" refers to a point of attachment to a repeating unit.

The term "condensed cyclic group" refers to a group having two or more rings, wherein at least two of the rings are fused, i.e., share at least two carbon atoms. Non-limiting examples include a C6 to C30 cycloalkane, a C5 to C30 heterocycloalkane, or naphthalene.

The term "copolymerization" includes random copolymerization, block copolymerization, or graft copolymerization, and the like, and the terms "polymer" and "copolymer" include a random copolymer, block copolymer, or graft copolymer, and the like.

The term "(meth)acrylate" refers to an acrylate group ($H_2C=CH-C(=O)O-$) and a methacrylate group ($H_2C=C(CH_3)-C(=O)-$), and (meth)acryloxy refers to an acryloxy group and a methacryloxy group.

According to an embodiment, a poly(amide-imide) block copolymer including a first segment including a repeating unit represented by the following Chemical Formula 1, and a second segment including a repeating unit represented by the following Chemical Formula 2 is provided.

Chemical Formula 1

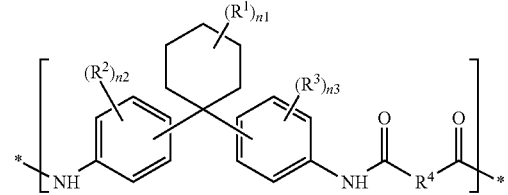

In Chemical Formula 1, $R^1$ to $R^3$ are the same or different in each repeating unit and are each independently hydrogen, a halogen, a hydroxy group, an alkoxy group ($-OR^{200}$, wherein $R^{200}$ is a C1 to C10 aliphatic group), a silyl group ($-SiR^{201}R^{202}R^{203}$, wherein $R^{201}$, $R^{202}$, and $R^{203}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and in an embodiment, $R^1$ to $R^3$ are each independently hydrogen or a substituted or unsubstituted C1 to C5 aliphatic group, and in another embodiment, $R^1$ to $R^3$ are each independently hydrogen or a substituted or unsubstituted C1 to C3 aliphatic group, $R^4$ is the same or different in each repeating unit, and each is independently a substituted or unsubstituted C6 to C30 aromatic group, n1 is the same or different in each repeating unit, and is an integer ranging from 0 to 10, specifically 0 to 5, and more specifically 0 to 3, and n2 and n3 are the same or different in each repeating unit, and are each independently an integer ranging from 0 to 4, specifically 0 to 3, and more specifically 0 to 2.

In an embodiment, $R^4$ in Chemical Formula is the same or different in each repeating unit, and each is independently one or more of the following chemical formulae, but is not limited thereto:

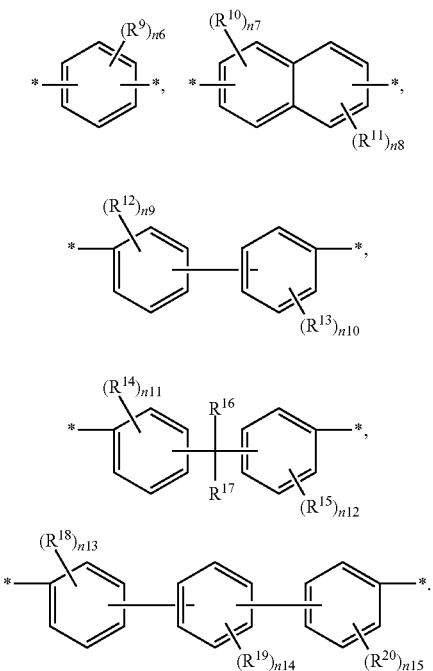

In the above chemical formulae, $R^9$ to $R^{29}$ are the same or different and are each independently hydrogen, deuterium, a halogen, a substituted or unsubstituted C1 to C10 aliphatic group, or a substituted or unsubstituted C6 to C20 aromatic group, and in an embodiment, $R^9$ to $R^{29}$ are each independently hydrogen, a substituted or unsubstituted C1 to C10 alkyl group, or a substituted or unsubstituted C6 to C20 aryl group, and in another embodiment, $R^9$ to $R^{20}$ are each independently hydrogen, methyl, ethyl, propyl, butyl, pentyl, hexyl, trifluoromethyl, difluoromethyl, 2-fluoroethyl, or penta-fluoroethyl, n6, and n9 to n15 are each independently an integer ranging from 0 to 4, and n7 and n8 are each independently an integer ranging from 0 to 3.

In another embodiment, $R^4$ in Chemical Formula 1 is the same or different in each repeating unit, and each is independently one or more of the following chemical formulae, but is not limited thereto:

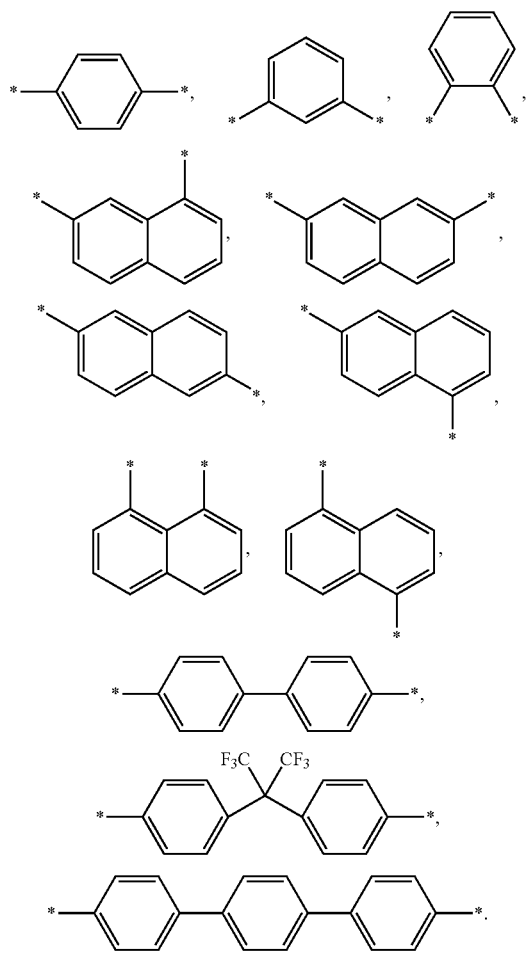

The first segment including a repeating unit represented by the above Chemical Formula 1 is an amide block including a bulky cycloalkylene group, and thus, while not wishing to be bound by theory, it is believed suppresses the formation of a charge transfer ("CT") complex, and may enhance or improve optical properties, solubility in a solvent, workability, and flexibility, and may decrease a coefficient of thermal expansion. Therefore, the poly(amide-imide) block copolymer including the first segment may have excellent or improved optical properties, for example, transparency, and excellent workability and flexibility, and a low coefficient of thermal expansion.

In an embodiment, the repeating unit represented by Chemical Formula 1 may include a repeating unit represented by the following Chemical Formulae 1-1 to 1-3, or a combination thereof, but is not limited thereto.

Chemical Formula 1-1

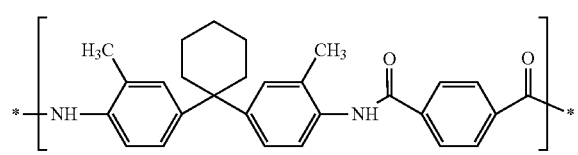

-continued

Chemical Formula 1-2

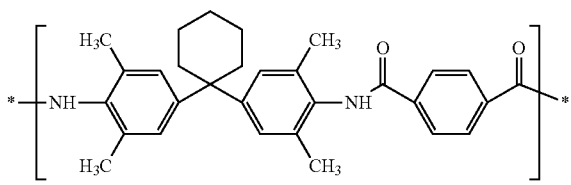

Chemical Formula 1-3

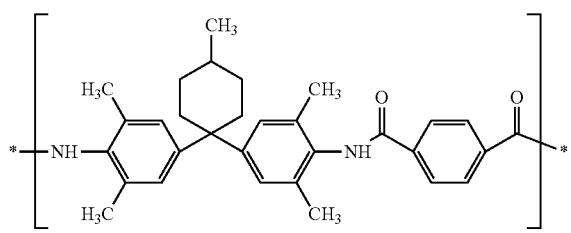

The first segment is the same or different in each poly(amide-imide) block copolymer and each independently includes about 1 to about 1000 repeating units of the repeating unit represented by Chemical Formula 1, wherein the repeating unit is the same or different in each first segment. When the first segment is included as a block of this size, the optical properties, workability, and flexibility of the poly(amide-imide) block copolymer including the first segment, may be effectively improved. In an embodiment, the first segment is the same or different in each poly(amide-imide) block copolymer and each independently includes about 1 to about 100 repeating units of the repeating unit represented by Chemical Formula 1, wherein the repeating unit is the same or different in each first segment, specifically about 1 to about 20 repeating units of the repeating unit represented by Chemical Formula 1, wherein the repeating unit is the same or different in each first segment.

The first segment may have a weight average molecular weight of about 500 grams per mole (g/mol) to about 50,000 g/mol. When the weight average molecular weight of the first segment is within the foregoing range, the optical properties, workability, and flexibility of the poly(amide-imide) block copolymer including the first segment may be effectively improved. In an embodiment, the first segment may have a weight average molecular weight of about 5,000 g/mol to about 30,000 g/mol, and more particularly the first segment may have a weight average molecular weight of about 7500 g/mol to about 25,000 g/mol.

Chemical Formula 2

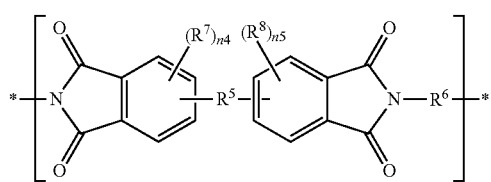

In Chemical Formula 2,
$R^5$ is the same or different in each repeating unit, and each is independently a single bond, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, —O—, —S—, —S(═O)$_2$—, or —C(═O)—, and in an embodiment, $R^5$ may be a single bond, a substituted or unsubstituted C1 to C10 aliphatic group, a substituted or unsubstituted C3 to 010 alicyclic group, a substituted or unsubstituted C6 to C15 aromatic group, a substituted or unsubstituted C2 to C15 heterocyclic group, —O—, —S—, —S(═O)$_2$—, or —C(═O)—, and in another embodiment, $R^5$ may be a single bond or a substituted or unsubstituted C1 to C10 aliphatic group, and in yet another embodiment, $R^5$ may be single bond or —C(CF$_3$)$_2$—.

$R^6$ in Chemical Formula 2, is the same or different in each repeating unit, and each is independently a substituted or unsubstituted C6 to C30 aromatic group, or a substituted or unsubstituted C3 to C30 alicyclic group, and in an embodiment, $R^6$ is a substituted or unsubstituted C6 to C15 aromatic group, or a substituted or unsubstituted C3 to C15 alicyclic group; wherein the alicyclic group, or aromatic group is present singularly, at least two of the alicyclic group, or aromatic group are linked to provide a condensed cyclic group, or at least two of the alicyclic group, or aromatic group are linked via a single bond, a substituted or unsubstituted C13 to C20 fluorenylene group, a substituted or unsubstituted C3 to C30 alicyclic group, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—. In an embodiment at least one alicyclic group, or aromatic group is substituted with an electron withdrawing group. In an embodiment, the electron withdrawing group may be a halogen, a nitro group, a cyano group, a C1 to C2 haloalkyl group, a C1 to C6 alkanoyl group, or a C1 to C6 ester group, and in another embodiment, —CF$_3$, —CCl$_3$, —CBr$_3$, —CI$_3$, —F, —Cl, —Br, —I, —NO$_2$, —CN, —COCH$_3$, or —CO$_2$C2H$_5$, but is not limited thereto.

In an embodiment, $R^6$ in Chemical Formula 2 is the same or different in each repeating unit and is each independently, a substituted or unsubstituted C6 to C15 arylene group, or a substituted or unsubstituted C3 to C15 cycloalkylene group, wherein the arylene group or cycloalkylene group is present singularly, at least two of the arylene group or cycloalkylene group are linked via a single bond, or a substituted or unsubstituted C3 to C15 cycloalkylene group, and in another embodiment, $R^6$ is each independently a C6 to C15 arylene group optionally substituted with hydrogen, or a substituted or unsubstituted C1 to C5 alkyl group, wherein at least two arylene groups are linked via a single bond, or a C3 to C15 cycloalkylene group optionally substituted with hydrogen, or a substituted or unsubstituted C1 to C5 alkyl group.

$R^7$ and $R^8$ in Chemical Formula 2 are the same or different in each repeating unit and are each independently hydrogen, a halogen, a hydroxy group, an alkoxy group (—OR$^{204}$, wherein R$^{204}$ is a C1 to C10 aliphatic group), a silyl group (—SiR$^{205}$R$^{206}$R$^{207}$, wherein R$^{205}$, R$^{206}$, and R$^{207}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and in an embodiment $R^7$ and $R^8$ are each independently hydrogen or a substituted or unsubstituted C1 to C5 aliphatic group, and in another embodiment $R^7$ and $R^8$ are each independently hydrogen, a substituted or unsubstituted C1 to C3 aliphatic group, and in yet another embodiment $R^7$ and $R^8$ are each independently hydrogen, methyl, ethyl, propyl, trifluoromethyl, difluoromethyl, 2-fluoroethyl, or penta-fluoroethyl.

n4 and n5 in Chemical Formula 2 are the same or different in each repeating unit and are each independently an integer ranging from 0 to 3, specifically 0 to 2, and more specifically 0 or 1.

The second segment including a repeating unit represented by the above Chemical Formula 2 is an imide block and may have excellent or improved heat resistance, and mechanical strength, and excellent or improved solvent resistance, including when an article is manufactured including the same, and thus, while not wishing to be bound by theory, it is believed may suppress crystallization during elongation. Therefore, the poly(amide-imide) block copolymer including the second segment may have excellent or improved thermal properties and mechanical strength.

In an embodiment, the repeating unit represented by Chemical Formula 2 may include a repeating unit represented by the following Chemical Formula 2-1, a repeating unit represented by the following Chemical Formula 2-2, or a combination thereof, but is not limited thereto.

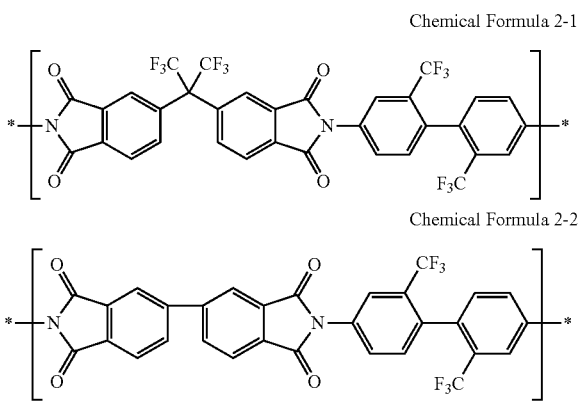

Chemical Formula 2-1

Chemical Formula 2-2

The second segment is the same or different in each poly(amide-imide) block copolymer and each independently includes about 1 to about 1000 repeating units of the repeating unit represented by Chemical Formula 2, wherein the repeating unit is the same or different in each second segment. When the second segment is included as a block of this size, the thermal properties, mechanical strength, and optical properties of the poly(amide-imide) block copolymer including the second segment, may be effectively improved. In an embodiment, the second segment is the same or different in each poly(amide-imide) block copolymer and each independently includes about 1 to about 100 repeating units of the repeating unit represented by Chemical Formula 2, wherein the repeating unit is the same or different in each first segment, specifically about 1 to about 20 repeating units of the repeating unit represented by Chemical Formula 2, wherein the repeating unit is the same or different in each second segment.

The second segment may have a weight average molecular weight of about 500 g/mol to about 50,000 g/mol. When the weight average molecular weight of the second segment is within the foregoing range, the thermal properties, mechanical strength, and optical properties of the poly(amide-imide) block copolymer including the second segment may be effectively improved. In an embodiment, the second segment may have a weight average molecular weight of about 5000 g/mol to about 30,000 g/mol, specifically the second segment may have a weight average molecular weight of about 7500 g/mol to about 25,000 g/mol.

The first segment may further include a repeating unit represented by the following Chemical Formula 3, a repeating unit represented by the following Chemical Formula 4, or a combination thereof.

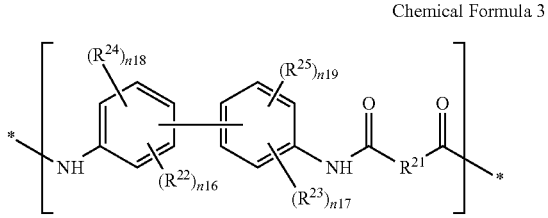

Chemical Formula 3

In Chemical Formula 3, $R^{21}$ is the same or different in each repeating unit, and each is independently a substituted or unsubstituted C6 to C30 aromatic group, and in an embodiment $R^{21}$ is each independently a substituted or unsubstituted C6 to C30 arylene group, and in another embodiment $R^{21}$ is each independently a substituted or unsubstituted phenylene group, a substituted or unsubstituted biphenylene group, a substituted or unsubstituted triphenylene group, a multi-ring ring system comprising at least two substituted or unsubstituted C6 to C30 phenylene groups linked via a single bond or a substituted or unsubstituted C1 to C18 alkylene group, or a combination thereof.

$R^{22}$ and $R^{23}$ in Chemical Formula 3 are the same or different in each repeating unit and are each independently an electron withdrawing group, and in an embodiment $R^{22}$ and $R^{23}$ are each independently a halogen, a nitro group, a cyano group, a C1 to C2 haloalkyl group, a C1 to C6 alkanoyl group, or a C1 to C6 ester group, and in another embodiment, $R^{22}$ and $R^{23}$ are each independently —$CF_3$, —$CCl_3$, —$CBr_3$, —$Cl_3$, —F, —Cl, —Br, —I, —$NO_2$, —CN, —$COCH_3$, or —$CO_2C_2H_5$.

$R^{24}$ and $R^{25}$ in Chemical Formula 3 are the same or different in each repeating unit and are each independently hydrogen, a halogen, a hydroxy group, an alkoxy group (—$OR^{208}$, wherein $R^{208}$ is a C1 to C10 aliphatic group), a silyl group (—$SiR^{209}R^{210}R^{211}$, wherein $R^{209}$, $R^{210}$, and $R^{211}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and in an embodiment, $R^{24}$ and $R^{25}$ are each independently hydrogen, a halogen, a hydroxyl group, an alkoxy group, a substituted or unsubstituted C1 to C10 alkyl group, a substituted or unsubstituted C3 to C15 cycloalkyl group, or a substituted or unsubstituted C6 to C20 aryl group, and in another embodiment, $R^{24}$ and $R^{25}$ are each independently hydrogen or a substituted or unsubstituted C1 to C5 alkyl group.

n16 in Chemical Formula 3 is the same or different in each repeating unit and is an integer ranging from 1 to 4, n18 is the same or different in each repeating unit and is an integer ranging from 0 to 4, the sum of n16 and n18 is an integer ranging from 1 to 4, n17 in Chemical Formula 3 is the same or different in each repeating unit and is an integer ranging from 1 to 4, n19 is the same or different in each repeating unit and is an integer ranging from 0 to 4, and the sum of n17 and n19 is an integer ranging from 1 to 4.

In an embodiment, the repeating unit represented by Chemical Formula 3 may include a repeating unit represented by the following Chemical Formulae 3-1 to 3-3, or a combination thereof, but is not limited thereto.

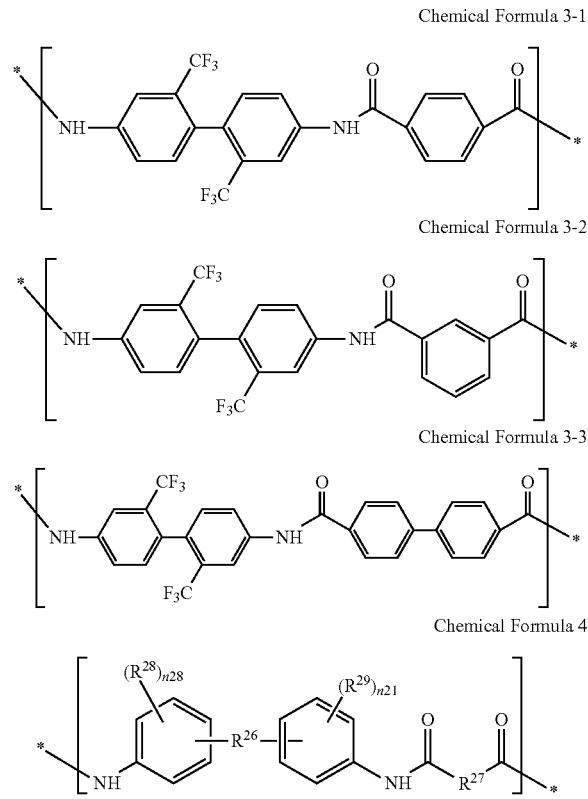

Chemical Formula 3-1

Chemical Formula 3-2

Chemical Formula 3-3

Chemical Formula 4

In Chemical Formula 4, $R^{26}$ is the same or different in each repeating unit, and each is independently —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, a substituted or unsubstituted C5 to C30 alicyclic group fused to each phenyl ring to provide a condensed cyclic group, or a substituted or unsubstituted C6 to C30 aromatic group, wherein the aromatic group is present singularly; at least two of the aromatic groups are linked to provide a condensed cyclic group; or at least two of the aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CF$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and in an embodiment $R^{26}$ is each independently —O—, —S—, —C(=O)—, —CH(OH)—, —S(=O)$_2$—, —Si(CH$_3$)$_2$—, —(CH$_2$)$_p$— (wherein 1≤p≤5), —(CF$_2$)$_q$— (wherein 1≤q≤5), —C(CH$_3$)$_2$—, —C(CF$_3$)$_2$—, —C(=O)NH—, or a substituted or unsubstituted C6 to C30 arylene group, and in another embodiment, $R^{26}$ is —S(=O)$_2$—.

$R^{27}$ in Chemical Formula 4 is the same or different in each repeating unit, and each is independently a substituted or unsubstituted C6 to C30 aromatic group, and in an embodiment $R^{27}$ is each independently a C6 to C30 arylene group, and in another embodiment $R^{27}$ is each independently a substituted or unsubstituted phenylene group, a substituted or unsubstituted biphenylene group, a substituted or unsubstituted triphenylene group, a multi-ring ring system comprising at least two substituted or unsubstituted C6 to C30 phenylene groups linked via a single bond or a substituted or unsubstituted C1 to C18 alkylene group, or a combination thereof.

$R^{28}$ and $R^{29}$ in Chemical Formula 4 are the same or different in each repeating unit and are each independently hydrogen, a halogen, a hydroxy group, an alkoxy group (—OR$^{212}$, wherein $R^{212}$ is a C1 to C10 aliphatic group), a silyl group (—SiR$^{213}$R$^{214}$R$^{215}$, wherein $R^{213}$, $R^{214}$, and $R^{215}$ are the same or different and are each independently hydrogen, or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and in an embodiment, $R^{28}$ and $R^{29}$ are each independently hydrogen, a halogen, a hydroxyl group, an alkoxy group, a substituted or unsubstituted C1 to C10 alkyl group, a substituted or unsubstituted C3 to C15 cycloalkyl group, or a substituted or unsubstituted C6 to C20 aryl group, and in another embodiment, $R^{28}$ and $R^{29}$ are each independently hydrogen or a substituted or unsubstituted C1 to C5 alkyl group.

n20 and n21 in Chemical Formula 4 are the same or different in each repeating unit and are each independently an integer ranging from 0 to 4.

In an embodiment, the repeating unit represented by Chemical Formula 4 may include a repeating unit represented by the following Chemical Formulae 4-1 to 4-3, but is not limited thereto.

Chemical Formula 4-1

Chemical Formula 4-2

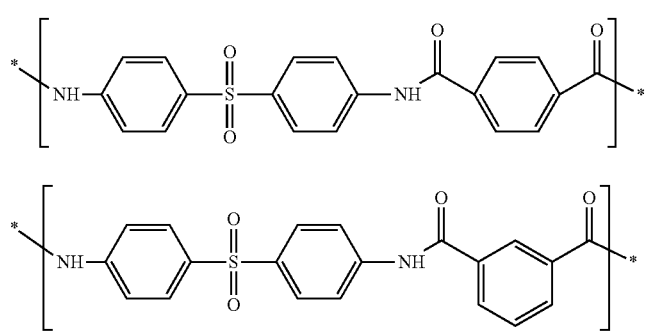

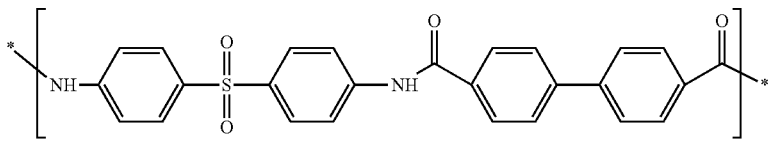

Chemical Formula 4-3

In the poly(amide-imide) block copolymer, when the first segment further includes a repeating unit represented by above Chemical Formula 3, a repeating unit represented by above Chemical Formula 4, or a combination thereof, the first segment and/or the poly(amide-imide) block copolymer may have improved light transmittance.

In the poly(amide-imide) block copolymer, a total moles of a repeating unit in the first segment and a total moles of a repeating unit in the second segment, are present at a mole ratio of about 95:5 to about 5:95. When the mole ratio of the total moles of a repeating unit included in the first segment and the total moles of a repeating unit included in the second segment is within the foregoing range, the poly(amide-imide) block copolymer may have excellent or improved optical properties, heat resistance, mechanical strength, and flexibility. In an embodiment, in the poly(amide-imide) block copolymer, the total moles of a repeating unit in the first segment and the total moles of a repeating unit in the second segment are present at a mole ratio of about 90:10 to about 10:90, and more specifically about 85:15 to about 15:85.

The poly(amide-imide) block copolymer according to an embodiment may facilitate improvement of optical properties of an article including the poly(amide-imide) block copolymer, for example, transparency, heat resistance, mechanical strength, and flexibility, by including the first segment having excellent or improved optical properties, solubility in a solvent, and workability, which may decrease the coefficient of thermal expansion, and the second segment having excellent or improved heat resistance, mechanical strength, and solvent resistance, when the article is manufactured, and may suppress the generation of crystals during elongation.

Also, since the poly(amide-imide) block copolymer according to an embodiment may be a block copolymer, the chemical structure of the copolymer may be easily controlled, and thus the poly(amide-imide) block copolymer may have a low coefficient of thermal expansion ("CTE").

In an embodiment, the poly(amide-imide) may be a random copolymer having different reactivity of each monomer therein, and it is difficult to control the chemical structure of the copolymer, and thus the poly(amide-imide) random copolymer may have a high coefficient of thermal expansion ("CTE").

Therefore, the poly(amide-imide) block copolymer may be used in various applications, including as a material for diverse articles, wherein the diverse articles may require transparency. For example, the poly(amide-imide) block copolymer may be useful for various applications, such as a substrate for a display device, which includes a substrate for a flexible display device, a touch panel, a protective film for an optical disk, and the like.

According to an embodiment, the poly(amide-imide) block copolymer may have a total light transmittance of greater than or equal to about 80% at a wavelength range of about 380 nm to about 780 nm, and may have light transmittance of greater than or equal to about 60% at a wavelength of about 400 nm. When the light transmittance of the poly (amide-imide) block copolymer is within the foregoing range, the poly(amide-imide) block copolymer may be used for manufacturing articles useful for diverse applications including diverse applications requiring transparency, and may have excellent or improved color reproducibility. In an embodiment, the poly(amide-imide) block copolymer may have a total light transmittance of about 85% to about 95% at a wavelength range of about 380 nm to about 780 nm, and may have light transmittance of about 65% to about 90% at a wavelength of about 400 nm.

Hereafter, a method for preparing the poly(amide-imide) block copolymer is described.

The method for preparing the poly(amide-imide) block copolymer includes: providing (e.g., preparing) a first segment including the repeating unit represented by Chemical Formula 1; providing (e.g., preparing) a precursor of a second segment including the repeating unit represented by Chemical Formula 2; copolymerizing the first segment and the precursor of the second segment; and imidizing the precursor of the second segment to provide the poly(amide-imide) block copolymer.

Unless otherwise mentioned, the repeating unit represented by Chemical Formula 1, the repeating unit represented by Chemical Formula 2, the first segment, the second segment, and the poly(amide-imide) block copolymer are as previously described.

The first segment is an amide block, and it may be prepared using a method such as a low-temperature solution polymerization method, an interface polymerization method, a fusion polymerization method, and a solid-phase polymerization method, without limitation.

In an embodiment, a low-temperature solution polymerization method for preparing the first segment is described. According to the low-temperature solution polymerization method, an amide block is prepared by polymerizing a dicarboxylic acid dichloride and a diamine in an aprotic polar solvent.

The aprotic polar solvent may include a sulfoxide-containing solvent such as dimethylsulfoxide and diethylsulfoxide, a formamide-containing solvent such as N,N-dimethylformamide and N,N-diethylformamide, an acetamide-containing solvent such as N,N-dimethylacetamide, N,N-dimethylmethoxyacetamide, and N,N-diethylacetamide, a pyrrolidone-containing solvent such as N-methyl-2-pyrrolidone, N-acetyl-2-pyrrolidone, and N-vinyl-2-pyrrolidone, a phenol-containing solvent such as a phenol, an o-, m-, or p-cresol, xylenol, a halogenated phenol, a catechol, hexamethylphosphoramide, γ-butyrolactone, tetrahydrothiophene dioxide, N-methyl-b-caprolactam, N,N,N',N'-tetramethylurea, or a mixture thereof. However, this disclosure is not limited to an aprotic polar solvent, and an aromatic hydrocarbon solvent such as xylene and toluene may be used. Also, to promote the dissolution of the polymer, an alkali metal salt or an alkaline earth metal salt may be further added to the solvent in an amount of less than or equal to about 50 weight percent (wt %) based on the total amount of the solvent.

The first segment may be obtained by combining and reacting a diamine including 1,1-bis(4-aminophenyl)cyclohexane, 1,1-bis(4-amino-3-methylphenyl)cyclohexane, 1,1-bis(4-amino-3,5-dimethylphenyl)cyclohexane, 1,1-bis(4-amino-3,5-dimethylphenyl)-4-methylcyclohexane, 4,4'-(9-fluorenylidene)dianiline ("BAPF"), 2,2'-bis(trifluoromethyl)benzidine ("TFDB"), 4,4'-diaminodiphenyl sulfone ("DADPS"), bis(4-(4-aminophenoxy)phenyl)sulfone ("BAPS"), 2,2',5,5'-tetrachlorobenzidine, 2,7-diaminofluorene, 4,4-diaminooctafluorobiphenyl, 3,3'-dihydroxybenzidine, or a combination thereof; and dicarboxylic acid dichloride including terephthaloyl chloride ("TPCl"), isophthaloyl chloride ("IPCl"), biphenyl dicarbonyl chloride ("BPCl"), naphthalene dicarbonyl chloride, terphenyl dicarbonyl chloride, 2-fluoro-terephthaloyl chloride, or a combination thereof, in the aprotic polar solvent. Herein, the kind and amount of the diamine and the dicarboxylic acid dichloride may be appropriately selected according to a desired composition of the first segment.

In an embodiment, when the first segment is prepared and an excessive amount of the diamine is used rather than the dicarboxylic acid dichloride, an amine group may be present at a terminal end of the first segment.

The second segment is an imide block, and may be prepared using a general process of first preparing a precursor of the second segment, which is an amic acid block, and then imidizing the precursor of the second segment. For example, the second segment may be prepared by reacting a tetracarboxylic dianhydride as a monomer with a diamine, so as to form an amic acid block, and then imidizing the amic acid block using a process such as a thermal solution imidization process or a chemical imidization process.

The amic acid block that is a precursor of the second segment may be prepared by combining and reacting a tetracarboxylic acid dianhydride including 2,2-bis(3,4-dicarboxyphenyl)hexafluoropropane dianhydride ("6FDA"), 3,3',4,4'-biphenyltetracarboxylic dianhydride ("BPDA"), benzophenone tetracarboxylic dianhydride (BTDA), bis(3,4-dicarboxyphenyl)sulfone dianhydride, or a combination thereof; and a diamine including 2,2'-bis(trifluoromethyl)benzidine ("TFDB"), 4,4'-diaminodiphenyl sulfone ("DADPS"), 4,4'-(9-fluorenylidene)dianiline ("BAPF"), bis(4-(4-aminophenoxy)phenyl)sulfone ("BAPS"), 2,2',5,5'-tetrachlorobenzidine, 2,7-diaminofluorene, 4,4'-methylene-bis(2-methylcyclohexylamine), 4,4-diaminooctafluorobiphenyl, 3,3'-dihydroxybenzidine, 1,3-cyclohexanediamine, or a combination thereof. Herein, the kind and amount of the diamine and the tetracarboxylic acid dianhydride may be appropriately selected according to a desired composition of the second segment.

In an embodiment, when the precursor of the second segment is prepared and an excessive amount of the diamine is used rather than the tetracarboxylic acid dianhydride, an amine group may be present at a terminal end of the precursor of the second segment.

Subsequently, a poly(amide-amic acid) block copolymer may be prepared by combining (e.g., mixing) and copolymerizing the first segment including an amine group at both terminals and the precursor of the second segment including an amine group at both terminals with a dicarboxylic acid dichloride including terephthaloyl chloride ("TPCl"), isophthaloyl chloride ("IPCl"), biphenyl dicarbonyl chloride, naphthalene dicarbonyl chloride, terphenyl dicarbonyl chloride, 2-fluoro-terephthaloyl chloride, or a combination thereof. Subsequently, a poly(amide-imide) block copolymer may be prepared by imidizing the poly(amide-amic acid) block copolymer. Herein, the kinds and amounts of the first segment, the precursor of the second segment, and the dicarboxylic acid dichloride may be appropriately selected and used according to a desired composition of the above-described poly(amide-imide) block copolymer. In an embodiment, the copolymerizing may be performed using a low-temperature solution polymerization method, and the imidization may be performed using a chemical imidization, but this disclosure is not limited thereto.

According to another embodiment, an article including the poly(amide-imide) block copolymer is provided. The article may be film, a fiber, a coating material, or an adhesive material, but is not limited thereto.

The article may be formed from the poly(amide-imide) block copolymer using a dry-wet method, a dry method, or a wet method, but this disclosure is not limited thereto.

According to an embodiment, a method for preparing the article may comprise disposing the poly(amide-imide) block copolymer on a substrate to form a layer; drying the layer; delaminating the layer from the substrate; elongating the layer; and heat treating the layer.

When the article is a film manufactured using the dry-wet method, a layer is formed by extruding the poly(amide-imide) block copolymer from a spinner on a supporter such as drum or an endless belt, drying the layer, and evaporating a solvent out of the layer until the layer has a self maintenance property. The drying may be performed at about 25° C. to about 220° C. for about 1 hour or less. More specifically the drying may be performed at about 25° C. to about 150° C. for about 1 hour or less. When the surface of the drum and/or the endless belt used for the drying process becomes flat, a layer with a flat surface is obtained. The layer obtained after the drying process is delaminated from the supporter, and inputted to a wet process for demineralization and/or desolventization, and the manufacturing of the film is completed as the layer is elongated, dried, and/or heat treated.

The elongating conforms to an elongation ratio, which may range from about 0.8 to about 8 in terms of surface ratio, and more specifically about 1.3 to about 8. Herein, the term "surface ratio" is defined as a value obtained by dividing the area of a layer after elongating by an area of the layer before elongating. A surface ratio of less than or equal to 1 denotes a relaxed state. According to an embodiment, the elongation ratio may range from about 1.3 to about 8. In an embodiment, the elongation may be performed not only in a surface direction but also in a thickness direction.

The heat treatment may be performed at a temperature of about 200° C. to about 500° C., and specifically at about 250° C. to about 400° C. for about a few seconds to a few minutes, specifically about 1 second to about 100 minutes, more specifically about 1 second to about 10 minutes.

Also, the film after elongating and heat treatment may be cooled slowly, particularly at a speed of about 50° C./second or lower.

The film may be formed as a single layer or as multiple layers.

An article including the poly(amide-imide) block copolymer may have a total light transmittance of greater than or equal to about 80% at a wavelength range of about 380 nm to about 780 nm, and may have a light transmittance of greater than or equal to about 60% at a wavelength of about 400 nm. When the light transmittance of the article including the poly(amide-imide) block copolymer is within the foregoing range, the article including the poly(amide-imide) block copolymer may have excellent or improved color reproducibility. In an embodiment, the article including the poly(amide-imide) block copolymer may have a total light transmittance of about 85% to about 95% at a wavelength range of about 380 nm to about 780 nm, and may have a light transmittance of about 65% to about 90% at a wavelength of about 400 nm.

The article including the poly(amide-imide) block copolymer may have a haze of less than or equal to about 3%. When the haze of the article is within the foregoing range, the article may be transparent enough to have excellent or improved clarity. In an embodiment, the article may have a haze of less than or equal to about 1.5%, specifically of less than or equal to about 1.2%.

The article including the poly(amide-imide) block copolymer may have a yellow index ("YI") of less than or equal to 3. When the yellow index (YI) of the article is within the foregoing range, the article may be transparent and colorless. In an embodiment, the article may have a yellow index (YI) of about 0.5 to about 2.5, specifically about 0.5 to about 2.2, and more specifically about 0.5 to about 2.0.

The article including the poly(amide-imide) block copolymer may have a coefficient of thermal expansion ("CTE") of less than or equal to about 35 parts per million per ° C. (ppm/° C.). When the coefficient of thermal expansion of the article is within the foregoing range, the article may have excellent or improved heat resistance. In an embodiment, the article may have a coefficient of thermal expansion of less than or equal to about 25 ppm/° C., and specifically less than or equal to about 15 ppm/° C.

The article including the poly(amide-imide) block copolymer, for example a film, may have a thickness of about 0.01 micrometers (μm) to about 1000 μm, but the disclosure is not limited to this and the thickness may be adjusted properly according to the usage. Specifically the article may have a thickness of about 10 μm to about 800 μm, and more specifically about 25 μm to about 100 μm.

While not wishing to be bound by theory, it is believed since the article includes the poly(amide-imide) block copolymer which has excellent or improved transparency, heat resistance, mechanical strength, and flexibility, the article may have excellent or improved transparency, heat resistance, mechanical strength, and flexibility as well. Therefore, the article may be used for diverse applications, such as a substrate for a device, a substrate for a display device, an optical film, an integrated circuit ("IC") package, an adhesive film, a multi-layer flexible printed circuit ("FPC"), a tape, a touch panel, and a protective film for an optical disk.

Another embodiment provides a display device including the article. The display device may include a liquid crystal display ("LCD"), an organic light emitting diode ("OLED"), and the like, but is not limited thereto.

Among the display devices, a liquid crystal display ("LCD") is described by referring to FIG. 1.

FIG. 1 is a cross-sectional view of a liquid crystal display ("LCD") in accordance with an embodiment.

Referring to FIG. 1, the liquid crystal display ("LCD") includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and they face each other with the gate electrode 124 between them.

A first gate electrode 124, a first source electrode 173, and a first drain electrode 175 constitute one thin film transistor ("TFT") together with the semiconductor 154, and a channel of the thin film transistor is formed in the semiconductor 154 disposed between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as indium tin oxide ("ITO") or indium zinc oxide ("IZO") is disposed on the protective layer 180. The pixel electrode 191 is connected to the drain electrode 175 through the contact hole 185.

The common electrode panel 200 will now be described.

The common electrode panel 200 includes a light blocking member 220 referred to as a black matrix disposed on a substrate 210, a color filter 230 disposed on the substrate 210 and the light blocking member 220, and a common electrode 270 formed on the color filter 230.

Herein, the substrates 110 and 210 may be articles including the poly(amide-imide) block copolymer.

Figure 2:
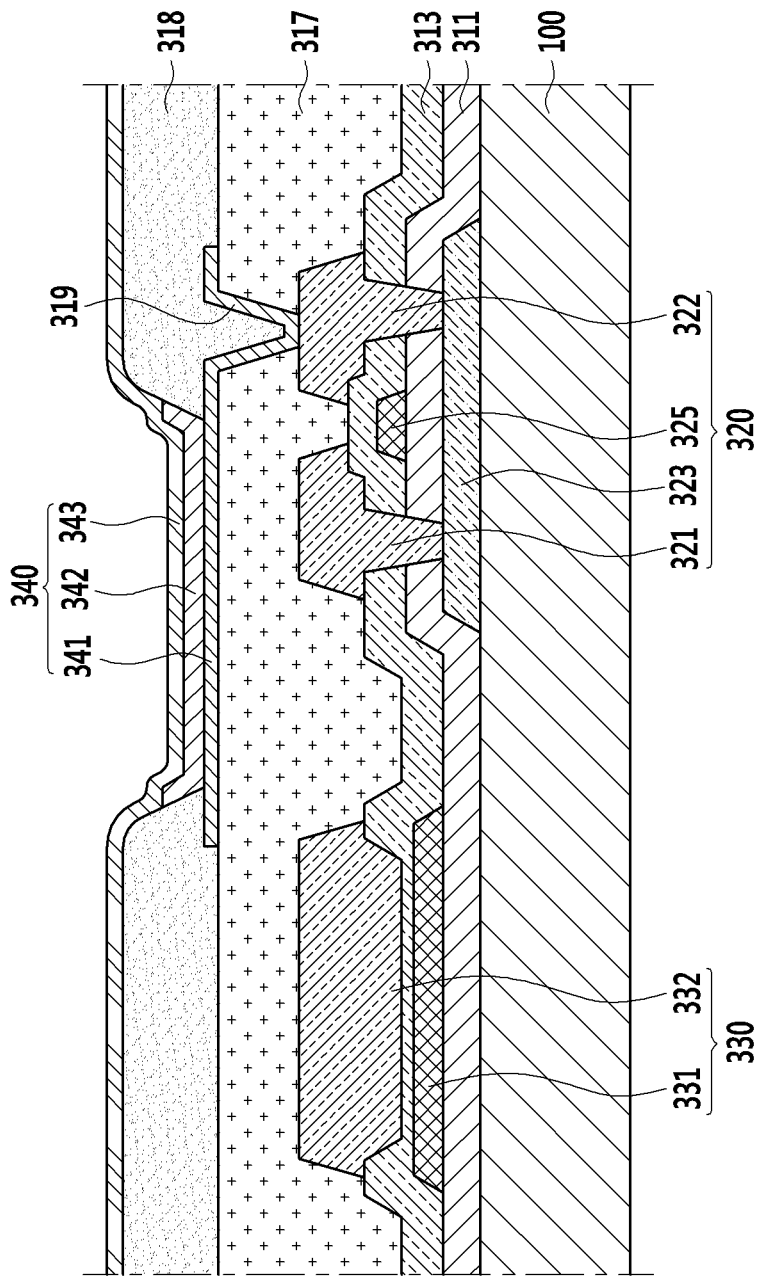
FIG. 2 is a cross-sectional view of an organic light emitting diode ("OLED") in accordance with an embodiment, as disclosed herein.

In an embodiment, a display device, such as an organic light emitting diode ("OLED") is described by referring to FIG. 2.

FIG. 2 is a cross-sectional view of an organic light emitting diode ("OLED") in accordance with an embodiment.

Referring to FIG. 2, a thin film transistor 320, a capacitor 330 and an organic light emitting diode 340 are disposed on a substrate 100. The thin film transistor 320 includes a source electrode 321, a semiconductor layer 323, a gate electrode 325, and a drain electrode 322, and the capacitor 330 includes a first capacitor layer 331 and a second capacitor layer 332. The organic light emitting diode 340 includes a pixel electrode 341, an intermediate layer 342, and an opposed electrode 343.

According to an embodiment, the semiconductor layer 323, a gate insulating layer 311, the first capacitor layer 331, the gate electrode 325, an interlayer insulating layer 313, the second capacitor layer 332, the source electrode 321, and the drain electrode 322 are disposed on the substrate 300. The source electrode 321 and the drain electrode 322 are isolated from each other, and they face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341, formed of a transparent conductive material such as ITO or IZO, is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is disposed in a portion where the pixel electrode 341, the intermediate layer 342, and the opposed electrode 343 are not disposed on the planarization layer 317.

Herein, the substrate 300 may be an article including the polyamide block copolymer.

Hereafter, the embodiments of this disclosure are illustrated in more detail with reference to examples and comparative examples. The following examples and comparative examples are for illustrative purposes only and are not intended to limit the scope of the one or more embodiments.

Synthesis Example 1

Synthesis of a First Segment 3.5747 grams (g) (0.0144 (moles)mol) of 4,4'-diaminodiphenyl sulfone ("DADPS") and 1.4133 g (0.0048 mol) of 1,1-bis(4-amino-3-methylphenyl)cyclohexane ("BAMCH") are introduced into a 250 milliliter (ml) 4-neck double-walled reactor having a mechanical agitator and a nitrogen injection hole, and 42 ml of N,N-dimethyl acetamide ("DMAc") is added thereto to provide a diamine solution.

The diamine solution is agitated until the monomers are completely dissolved, and cooled to a temperature of 5° C. under a nitrogen atmosphere.

Then 1.9491 g (0.0096 mol) of terephthaloyl chloride ("TPCl") is added thereto over a period of 30 minutes in 4 steps. The temperature of the reactor is increased to 10° C.

The resultant is reacted while agitating it for one hour to obtain a first segment. The obtained first segment has a weight average molecular weight of 14,320 grams per mole (g/mol).

Synthesis Example 2 to 9

Synthesis of a First Segment

A first segment is prepared in accordance with the same method as described in Synthesis Example 1, except that the kinds and the amounts of diamine and dicarboxylic acid dichloride are changed as shown in the following Table 1.

The compounds include 1,1-bis(4-amino-3-methylphenyl)cyclohexane ("diamine A"), 1,1-bis(4-amino-3,5-dimethylphenyl)cyclohexane, ("diamine B"), 1,1-bis(4-amino-3,5-dimethylphenyl)-4-methylcyclohexane ("diamine C"), 4,4'-diaminodiphenyl sulfone ("DADPS"), 2,2'-bis(trifluoromethyl)benzidine ("TFDB"), terephthaloyl chloride ("TPCl"), and biphenyl dicarbonyl chloride ("BPCl").

Synthesis Example 10

Synthesis of Precursor of Second Segment 25.6 g (0.08 mol) of 2,2'-bis(trifluoromethyl)benzidine ("TFDB") is introduced into a 250 ml 4-neck double-walled reactor having a mechanical agitator and a nitrogen injection hole, and 90 g of N,N-dimethyl acetamide ("DMAc") is added thereto and dissolved at a temperature of 20° C. under a nitrogen atmosphere.

26.65 g (0.06 mol) of 2,2-bis(3,4-dicarboxyphenyl)hexafluoropropane dianhydride ("6FDA") and 14.5 g of dimethyl acetamide ("DMAc") are added thereto and reacted at a temperature of 20° C. for 48 hours to provide a second segment precursor solution.

The obtained second segment precursor has a weight average molecular weight of 18,300 g/mol.

Synthesis Examples 11 to 14

Synthesis of Precursor of Second Segment

A precursor solution of the second segment is prepared in accordance with the same procedure as described in Synthesis Example 10, except that the kinds and amounts of diamine and tetracarboxylic acid dianhydride are changed as shown in the following Table 2.

The compounds include 1,1-bis(4-amino-3-methylphenyl)cyclohexane ("diamine A"), 1,1-bis(4-amino-3,5-dimethylphenyl)cyclohexane ("diamine B"), 1,1-bis(4-amino-3,5-dimethylphenyl)-4-methylcyclohexane ("diamine C"), 2,2'-bis(trifluoromethyl)benzidine ("TFDB"), 2,2-bis(3,4-dicarboxyphenyl)hexafluoropropane dianhydride ("6FDA"), and 3,3',4,4'-biphenyltetracarboxylic dianhydride ("BPDA").

TABLE 1

|  | Diamine (mol) | | | | | Carboxylic acid dichloride (mol) | | Weight average molecular weight (g/mol) |
| --- | --- | --- | --- | --- | --- | --- | --- | --- |
|  | DADPS | TFDB | diamine A | diamine B | diamine C | TPCl | BPCl |  |
| Synthesis Example 1 | 0.0144 | — | 0.0048 | — | — | 0.0096 | — | 14,320 |
| Synthesis Example 2 | 0.0144 | — | — | 0.0048 | — | 0.0096 | — | 16,020 |
| Synthesis Example 3 | 0.0144 | — | — | — | 0.0048 | 0.0096 | — | 12,080 |
| Synthesis Example 4 | 0.012 | 0.0024 | 0.0048 | — | — | 0.0096 | — | 18,300 |
| Synthesis Example 5 | 0.012 | 0.0024 | — | 0.0048 | — | 0.0096 | — | 19,200 |
| Synthesis Example 6 | 0.0168 | — | — | 0.0024 | — | — | 0.0096 | 15,960 |
| Synthesis Example 7 | 0.0185 | 0.0053 | — | — | — | 0.006 | 0.006 | 17,320 |
| Synthesis Example 8 | 0.0185 | 0.0053 | — | — | — | 0.0188 | 0.006 | 18,000 |
| Synthesis Example 9 | 0.0168 | — | — | — | 0.0024 | 0.017 | 0.004 | 17,880 |

TABLE 2

| | Diamine (mol) | | | Tetracarboxylic acid Dianhydride (mol) | | Weight average molecular weight (g/mol) |
| --- | --- | --- | --- | --- | --- | --- |
| | TFDB | diamine A | diamine B | diamine C | 6FDA | BPDA | |
| Synthesis Example 10 | 0.08 | — | — | — | 0.06 | — | 15,320 |
| Synthesis Example 11 | — | 0.08 | — | — | 0.06 | — | 19,300 |
| Synthesis Example 12 | — | — | 0.02 | — | — | 0.013 | 17,300 |
| Synthesis Example 13 | — | — | — | 0.02 | — | 0.013 | 18,800 |
| Synthesis Example 14 | — | — | — | 0.08 | 0.06 | — | 16,400 |

Preparation of Poly(Amide-Imide) Block Copolymer and Film

Example 1

14.7935 g of the second segment precursor solution obtained from Synthesis Example 10 is added into the first segment obtained from Synthesis Example 1. The temperature of the reactor is maintained at 5° C.

Then 2.2739 g (0.0112 mol) of terephthaloyl chloride ("TPCl") is added thereto in 4 steps. The temperature of the reactor is increased to about 10° C. and reacted while agitating for one hour.

The temperature of the reactor is increased to 20° C. and 1.2 ml (0.0128 mol) of acetic anhydride is added thereto and agitated for 30 minutes.

5.5 ml (0.0672 mol) of pyridine is added thereto and reacted for 21 hours to provide a poly(amide-imide) block copolymer solution.

The obtained poly(amide-imide) block copolymer solution is poured into distilled water and is precipitated. The obtained precipitate is ground twice using a blender and washed with ethanol and filtered.

The filtered product is placed in a vacuum oven and dried at a temperature of 80° C. overnight to provide a poly(amide-imide) block copolymer.

The poly(amide-imide) block copolymer is coated on a glass substrate and dried at 65° C., 70° C., and 75° C., each, for 20 minutes, and then dried at 80° C. and 130° C. each, for 30 minutes, to provide a film. The obtained film is elongated in one direction at 280° C. at a speed of 1%/second to just before cloudiness forms. The elongated film is annealed at 320° C. for 7 minutes under a nitrogen atmosphere to provide a film. The film has a thickness of 44 μm.

Examples 2 to 5

Poly(amide-imide) block copolymers and films are fabricated in accordance with the same procedure as described in Example 1, except that the kinds and amounts of the first segment and the precursor solution of the second segment are changed as shown in the following Table 3.

Comparative Examples 1 to 4

Poly(amide-imide) block copolymers and films are fabricated in accordance with the same procedure as in Example 1, except that the kinds and amounts of the first segment and the precursor solution of the second segment are changed as shown in the following Table 3.

TABLE 3

| | Kind of the first segment | Kind of the second segment | Carboxylic acid dichloride | | | Film thickness (μm) |
| --- | --- | --- | --- | --- | --- | --- |
| | | | TPCI (mol) | IPCI (mol) | BPCI (mol) | |
| Example 1 | Synthesis Example 1 | Synthesis Example 10 | 0.0112 | — | — | 44 |
| Example 2 | Synthesis Example 2 | Synthesis Example 10 | 0.0112 | — | — | 33 |
| Example 3 | Synthesis Example 3 | Synthesis Example 10 | 0.0112 | — | — | 50 |
| Example 4 | Synthesis Example 4 | Synthesis Example 10 | 0.0112 | — | — | 36 |
| Example 5 | Synthesis Example 5 | Synthesis Example 10 | 0.0112 | — | — | 52 |
| Comparative Example 1 | Synthesis Example 6 | Synthesis Example 11 | 0.0112 | — | — | 43 |
| Comparative Example 2 | Synthesis Example 7 | Synthesis Example 12 | 0.0128 | — | — | 50 |
| Comparative Example 3 | Synthesis Example 8 | Synthesis Example 13 | 0.0128 | — | — | 50 |
| Comparative Example 4 | Synthesis Example 9 | Synthesis Example 14 | 0.0112 | — | — | 54 |

Optical Properties

In order to evaluate the optical properties of films obtained from Examples 1 to 5 and Comparative Examples 1 to 4, the light transmittance, the haze, and the yellow index ("YI") are measured by a KONICA MINOLTA spectrophotometer, and the results are shown in the following Table 4.

TABLE 4

| | Total light transmittance (%, 380 nm to 780 nm) | Light transmittance (%, 400 nm) | Haze (%) | Yellow index |
| --- | --- | --- | --- | --- |
| Example 1 | 87.59 | 67.13 | 1.11 | 2.15 |
| Example 2 | 87.74 | 79.55 | 1.12 | 1.97 |
| Example 3 | 87.86 | 79.22 | 0.99 | 1.88 |
| Example 4 | 87.81 | 72.94 | 0.63 | 1.96 |
| Example 5 | 88.11 | 81.54 | 0.5 | 1.48 |
| Comparative Example 1 | 84.62 | 61.3 | 2.59 | 8.85 |
| Comparative Example 2 | 86.59 | 70.95 | 0.88 | 4.09 |
| Comparative Example 3 | 86.36 | 63.06 | 0.85 | 6.43 |
| Comparative Example 4 | 81.8 | 43.36 | 4.69 | 16.83 |

As shown in Table 4, the films obtained from Examples 1 to 5 have total light transmittance of greater than or equal to about 87.59% at a range of about 380 nm to about 780 nm, light transmittance of greater than or equal to about 67.13% at about 400 nm, haze of less than or equal to about 1.12%, and a yellow index of less than or equal to 2.15, and have excellent heat resistance and optical properties.

In contrast, the films obtained from Comparative Examples 1 to 4 have inferior total light transmittance at a range of about 380 nm to about 780 nm, inferior light transmittance at about 400 nm, and an inferior yellow index compared to those of Examples 1 to 5. In addition, although the films obtained from Comparative Examples 2 and 3 have comparable haze characteristics to the films obtained from Examples 1 to 5, the film obtained from Comparative Examples 1 and 4 has inferior haze characteristics to those of Examples 1 to 5.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A poly(amide-imide) block copolymer, comprising:

a first segment comprising a repeating unit represented by the following Chemical Formula 1; and a second segment comprising a repeating unit represented by the following Chemical Formula 2:

Chemical Formula 1

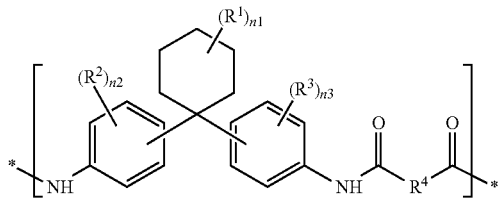

wherein, in Chemical Formula 1, $R^1$ to $R^3$ are the same or different in each repeating unit and are each independently hydrogen, a halogen, a hydroxy group, an alkoxy group (—$OR^{200}$, wherein $R^{200}$ is a C1 to C10 aliphatic group), a silyl group (—$SiR^{201}R^{202}R^{203}$, wherein $R^{201}$, $R^{202}$, and $R^{203}$ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, $R^4$ is the same or different in each repeating unit and each is independently one or more of the following chemical formulae:

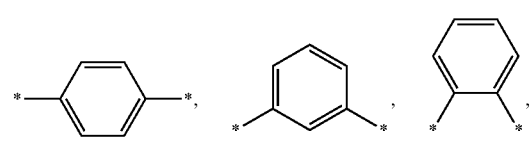

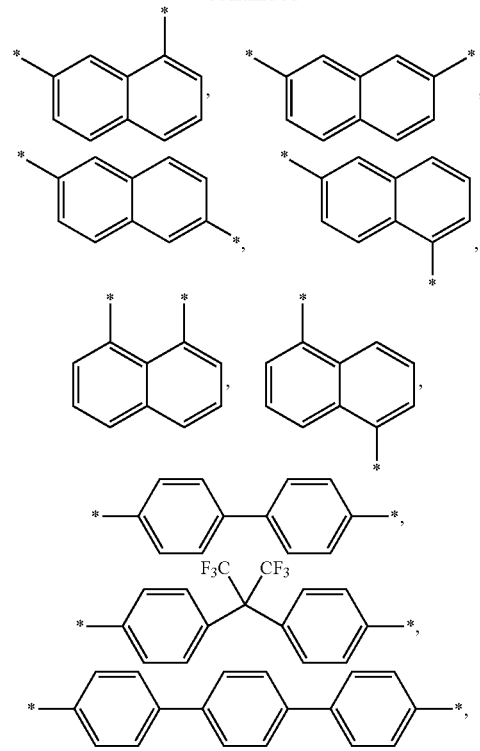

n1 is the same or different in each repeating unit and is an integer ranging from 0 to 10, and n2 and n3 are the same or different in each repeating unit and are each independently an integer ranging from 0 to 4, Chemical Formula 2

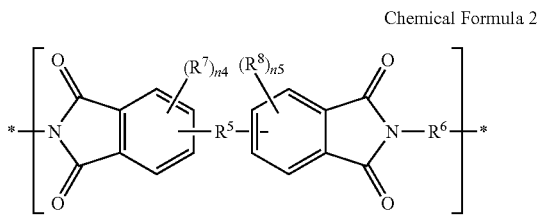

$R^5$ is the same or different in each repeating unit, and each is independently a single bond, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, —O—, —S—, —S(=O)$_2$—, or —C(=O)—, $R^6$ is the same or different in each repeating unit, and each is independently a substituted or unsubstituted C6 to C30 aromatic group, or a substituted or unsubstituted C3 to C30 alicyclic group, wherein the alicyclic group, or aromatic group is present singularly; at least two of the alicyclic group, or aromatic group are linked to provide a condensed cyclic group; or at least two of the alicyclic group, or aromatic group are linked via a single bond, a substituted or unsubstituted C13 to C20 fluorenylene group, a substituted or unsubstituted C3 to C30 alicyclic group, —O—, —S—, —C(=O)—, —CH(OH)—, —S(=O)₂—, —Si(CH₃)₂—, —(CH₂)$_p$— (wherein 1≤p≤10), —(CF₂)$_q$— (wherein 1≤q≤10), —C(CH₃)₂—, —C(CF₃)₂—, or —C(=O)NH—, and R⁷ and R⁸ are the same or different in each repeating unit and are each independently hydrogen, a halogen, a hydroxy group, an alkoxy group (—OR²⁰⁴, wherein R²⁰⁴ is a C1 to C10 aliphatic group), a silyl group (—SiR²⁰⁵R²⁰⁶R²⁰⁷, wherein R²⁰⁵, R²⁰⁶, and R²⁰⁷ are the same or different and are each independently hydrogen or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and n4 and n5 are the same or different in each repeating unit and are each independently an integer ranging from 0 to 3.

2. The poly(amide-imide) block copolymer of claim 1, wherein the R¹ to R³, R⁷, and R⁸ are the same or different in each repeating unit and are each independently hydrogen, or a substituted or unsubstituted C1 to C5 aliphatic group, n1 is the same or different in each repeating unit and is an integer ranging from 0 to 5, n2 and n3 are the same or different in each repeating unit and are each independently an integer ranging from 0 to 3, n4 and n5 are the same or different in each repeating unit and are each independently an integer ranging from 0 to 2, R⁵ is the same or different in each repeating unit, and each is independently a single bond, a substituted or unsubstituted C1 to C10 aliphatic group, a substituted or unsubstituted C3 to C10 alicyclic group, a substituted or unsubstituted C6 to C15 aromatic group, a substituted or unsubstituted C2 to C15 heterocyclic group, —O—, —S—, —S(=O)₂—, or —C(=O)—, and R⁶ is the same or different in each repeating unit, and each is independently a substituted or unsubstituted C6 to C15 aromatic group, or a substituted or unsubstituted C3 to C15 alicyclic group.

3. The poly(amide-imide) block copolymer of claim 2, wherein the R¹ to R³, R⁷, and R⁸ are the same or different in each repeating unit and are each independently hydrogen, or a substituted or unsubstituted C1 to C3 aliphatic group, n1 is the same or different in each repeating unit and is an integer ranging from 0 to 3, n2 and n3 are the same or different in each repeating unit and are each independently an integer ranging from 0 to 2, n4 and n5 are the same or different in each repeating unit and are each independently an integer of 0 or 1, and R⁵ is the same or different in each repeating unit, and each is independently a single bond or C(CF₃)₂.

4. The poly(amide-imide) block copolymer of claim 1, wherein the repeating unit represented by Chemical Formula 1 comprises a repeating unit represented by the following Chemical Formula 1-1 to 1-3, or a combination thereof, and the repeating unit represented by Chemical Formula 2 comprises a repeating unit represented by the following Chemical Formula 2-1, a repeating unit represented by the following Chemical Formula 2-2, or a combination thereof:

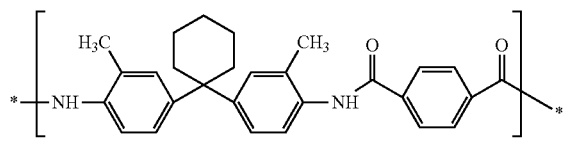

Chemical Formula 1-1

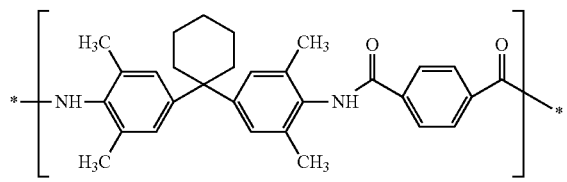

Chemical Formula 1-2

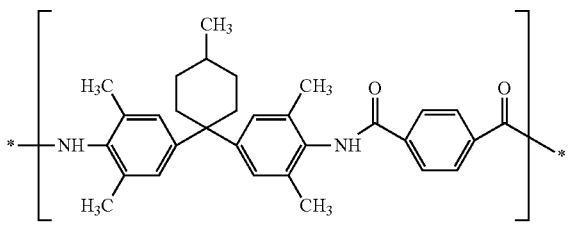

Chemical Formula 1-3

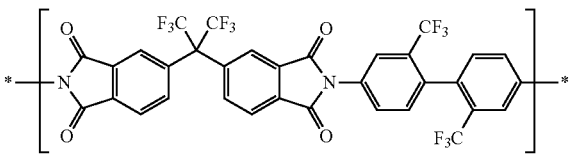

Chemical Formula 2-1

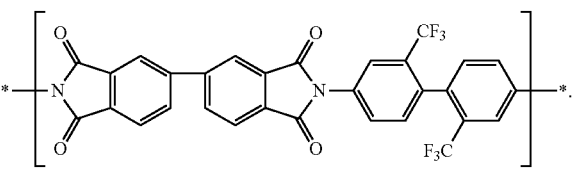

Chemical Formula 2-2

5. The poly(amide-imide) block copolymer of claim 1, wherein the first segment is the same or different in each poly(amide-imide) block copolymer and each independently comprises about 1 to about 1000 repeating units of the repeating unit represented by Chemical Formula 1, wherein the repeating unit is the same or different in each first segment.

6. The poly(amide-imide) block copolymer of claim 1, wherein the first segment has a weight average molecular weight of about 500 grams per mole to about 50,000 grams per mole.

7. The poly(amide-imide) block copolymer of claim 1, wherein the first segment further comprises a repeating unit represented by the following Chemical Formula 3, a repeating unit represented by the following Chemical Formula 4, or a combination thereof:

Chemical Formula 3

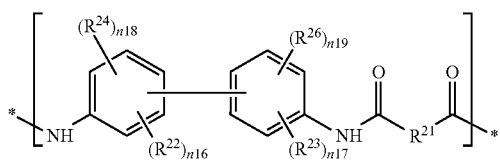

wherein, in Chemical Formula 3,
R$^{21}$ is the same or different in each repeating unit and each is independently a substituted or unsubstituted C6 to C30 aromatic group,
R$^{22}$ and R$^{23}$ are the same or different in each repeating unit and are each independently an electron withdrawing group,
R$^{24}$ and R$^{25}$ are the same or different in each repeating unit and are each independently hydrogen, a halogen, a hydroxy group, an alkoxy group (—OR$^{208}$, wherein R$^{208}$ is a C1 to C10 aliphatic group), a silyl group (—SiR$^{209}$R$^{210}$R$^{211}$, wherein R$^{209}$, R$^{210}$ and R$^{211}$ are the same or different and are each independently hydrogen, or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group,
n16 is the same or different in each repeating unit and is an integer ranging from 1 to 4, n18 is the same or different in each repeating unit and is an integer ranging from 0 to 4, and a sum of n16 and n18 is an integer ranging from 1 to 4,
n17 is the same or different in each repeating unit and is an integer ranging from 1 to 4, n19 is the same or different in each repeating unit and is an integer ranging from 0 to 4, and a sum of n17 and n19 is an integer ranging from 1 to 4, Chemical Formula 4

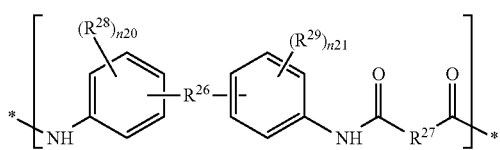

wherein, in Chemical Formula 4,
R$^{26}$ is the same or different in each repeating unit, and each is independently —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, a substituted or unsubstituted C5 to C30 alicyclic group fused to each phenyl ring to provide a condensed cyclic group, or a substituted or unsubstituted C6 to C30 aromatic group, wherein the aromatic group is present singularly; at least two of the aromatic groups are linked to provide a condensed cyclic group; or at least two of the aromatic groups are linked via a single bond, a substituted or unsubstituted C13 to C20 fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—,
R$^{27}$ is the same or different in each repeating unit and each is independently a substituted or unsubstituted C6 to C30 aromatic group,
R$^{28}$ and R$^{29}$ are the same or different in each repeating unit and are each independently hydrogen, a halogen, a hydroxy group, an alkoxy group (—OR$^{212}$, wherein R$^{212}$ is a C1 to C10 aliphatic group), a silyl group (—SiR$^{213}$R$^{214}$R$^{215}$, wherein R$^{213}$, R$^{214}$, and R$^{215}$ are the same or different and are each independently hydrogen, or a C1 to C10 aliphatic group), a substituted or unsubstituted C1 to C10 aliphatic group, a substituted or unsubstituted C3 to C30 alicyclic group, or a substituted or unsubstituted C6 to C20 aromatic group, and
n20 and n21 are the same or different in each repeating unit and are each independently an integer ranging from 0 to 4.

8. The poly(amide-imide) block copolymer of claim 7, wherein the R$^{22}$ and R$^{23}$ are the same or different in each repeating unit and are each independently —CF$_3$, —CCl$_3$, —CBr$_3$, —CI$_3$, —F, —Cl, —Br, —I, —NO$_2$, —CN, —COCH$_3$, or —CO$_2$C$_2$H$_5$.

9. The poly(amide-imide) block copolymer of claim 7, wherein the repeating unit represented by Chemical Formula 3 comprises a repeating unit represented by the following Chemical Formulae 3-1 to 3-3, or a combination thereof, and
the repeating unit represented by Chemical Formula 4 comprises a repeating unit represented by the following Chemical Formulae 4-1 to 4-3:

Chemical Formula 3-1

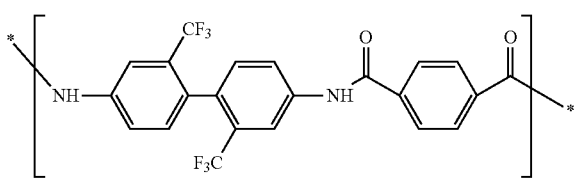

Chemical Formula 3-2

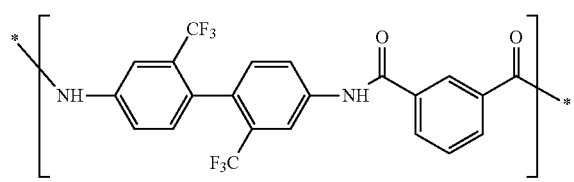

Chemical Formula 3-3

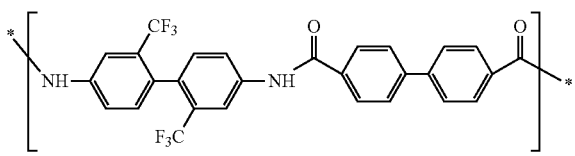

Chemical Formula 4-1

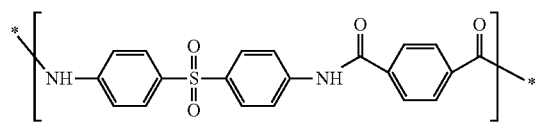

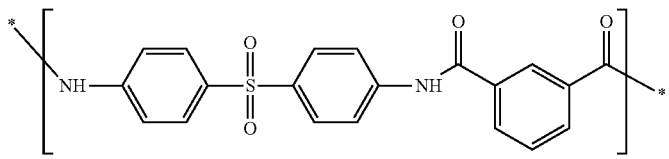

Chemical Formula 4-2

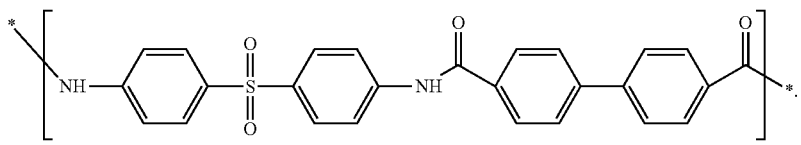

Chemical Formula 4-3

10. The poly(amide-imide) block copolymer of claim 1, wherein the second segment is the same or different in each poly(amide-imide) block copolymer and each independently comprises about 1 to about 1000 repeating units of the repeating unit represented by Chemical Formula 2, wherein the repeating unit is the same or different in each second segment.

11. The poly(amide-imide) block copolymer of claim 1, wherein the second segment has a weight average molecular weight of about 500 grams per mole to about 50,000 grams per mole.

12. The poly(amide-imide) block copolymer of claim 1, wherein a total moles of a repeating unit of the first segment and a total moles of a repeating unit of the second segment are present at a mole ratio of about 95:5 to about 5:95.

13. An article including the poly(amide-imide) block copolymer according to claim 1.

14. The article of claim 13, wherein the article is a film, a fiber, a coating material, or an adhesive.

15. The article of claim 13, wherein the article has a total light transmittance of greater than or equal to about 80% at a wavelength range of about 380 nanometers to about 780 nanometers.

16. The article of claim 13, wherein the article has a light transmittance of greater than or equal to about 60% at a wavelength of about 400 nanometers.

17. The article of claim 13, wherein the article has a haze of less than or equal to about 3%.

18. The article of claim 13, wherein the article has a yellow index (YI) of less than or equal to about 3.

19. The article of claim 13, wherein the article has a coefficient of thermal expansion of less than or equal to about 35 parts per million per ° C.

20. A display device including the article according to claim 13.

21. A method for preparing a poly(amide-imide) block copolymer, the method comprising:
   providing a first segment;
   providing a precursor of a second segment reactive with the first segment;
   copolymerizing the first segment and the precursor of the second segment; and
   imidizing the precursor of the second segment to provide the poly(amide-imide) block copolymer, wherein the poly(amide-imide) block copolymer comprises the poly(amide-imide) block copolymer of claim 1.

22. A method for preparing an article, the method comprising:
   disposing the poly(amide-imide) block copolymer of claim 1 on a substrate to form a layer;
   drying the layer;
   delaminating the layer from the substrate;
   elongating the layer; and
   heat treating the layer.

* * * * *